(12) United States Patent
Someya et al.

(10) Patent No.: US 10,127,936 B2
(45) Date of Patent: Nov. 13, 2018

(54) DYNAMIC VIBRATION ABSORBER, FLEXURE, AND HEAD SUPPORT MECHANISM

(71) Applicant: TDK CORPORATION, Tokyo (JP)

(72) Inventors: Taku Someya, Tokyo (JP); Hideki Kuwajima, Tokyo (JP)

(73) Assignee: TDK CORPORATION, Tokyo (JP)

( * ) Notice: Subject to any disclaimer, the term of this patent is extended or adjusted under 35 U.S.C. 154(b) by 432 days.

(21) Appl. No.: 14/834,008

(22) Filed: Aug. 24, 2015

(65) Prior Publication Data

US 2016/0055870 A1 Feb. 25, 2016

(30) Foreign Application Priority Data

Aug. 25, 2014 (JP) .................................. 2014-170698

(51) Int. Cl.
*G11B 5/48* (2006.01)

(52) U.S. Cl.
CPC .................................. *G11B 5/4833* (2013.01)

(58) Field of Classification Search
CPC ..... G11B 5/486; G11B 5/4826; G11B 5/4833; G11B 5/4853
See application file for complete search history.

(56) References Cited

U.S. PATENT DOCUMENTS

| | | | |
|---|---|---|---|
| 5,763,981 A * | 6/1998 | Okazaki | H02N 2/0045 310/317 |
| 6,072,664 A | 6/2000 | Aoyagi et al. | |
| 6,163,440 A * | 12/2000 | Takahashi | G11B 5/54 360/256.4 |
| 6,222,704 B1 | 4/2001 | Aoyagi et al. | |
| 6,697,225 B2 * | 2/2004 | Wittig | G11B 5/4833 360/244.9 |
| 7,859,795 B2 * | 12/2010 | Kerner | G11B 5/5526 360/244.9 |
| 7,933,097 B1 * | 4/2011 | Lowry | G11B 5/4833 360/244.3 |
| 8,432,641 B1 * | 4/2013 | Nguyen | G11B 5/4833 360/265.9 |
| 9,153,261 B1 * | 10/2015 | Kerner | G11B 5/4806 |
| 2006/0209466 A1 | 9/2006 | Ono et al. | |
| 2006/0258480 A1 * | 11/2006 | Hou | A63B 53/04 473/332 |
| 2007/0149316 A1 * | 6/2007 | Nishino | A63B 53/0466 473/335 |

(Continued)

FOREIGN PATENT DOCUMENTS

| | | |
|---|---|---|
| JP | S63-306575 A | 12/1988 |
| JP | H10-302423 A | 11/1998 |
| JP | 2006-172568 A | 6/2006 |

(Continued)

*Primary Examiner* — Carlos E Garcia

(74) *Attorney, Agent, or Firm* — Oliff PLC

(57) ABSTRACT

A dynamic vibration absorber includes an arm section that includes an elastic unit; and a weight section that is connected to the arm section and includes a mass unit. The arm section and the weight section each include a plurality of stacked single-layer materials having different degrees of elasticity and specific gravities, and at least one of the single-layer materials of the arm section and at least one of the single-layer materials of the weight section are shared in common.

20 Claims, 18 Drawing Sheets

(56) References Cited

U.S. PATENT DOCUMENTS

2010/0061020 A1    3/2010  Maslov et al.
2012/0002322 A1*   1/2012  Kikuchi ............... G11B 5/4826
                                                          360/99.08

FOREIGN PATENT DOCUMENTS

JP          2010-061784 A    3/2010
JP          04-838751 B2    12/2011

* cited by examiner

FIG. 9
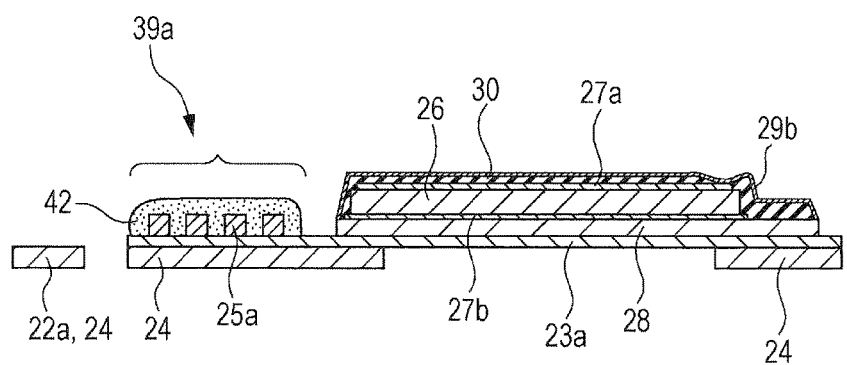
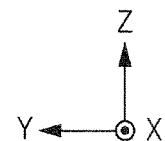

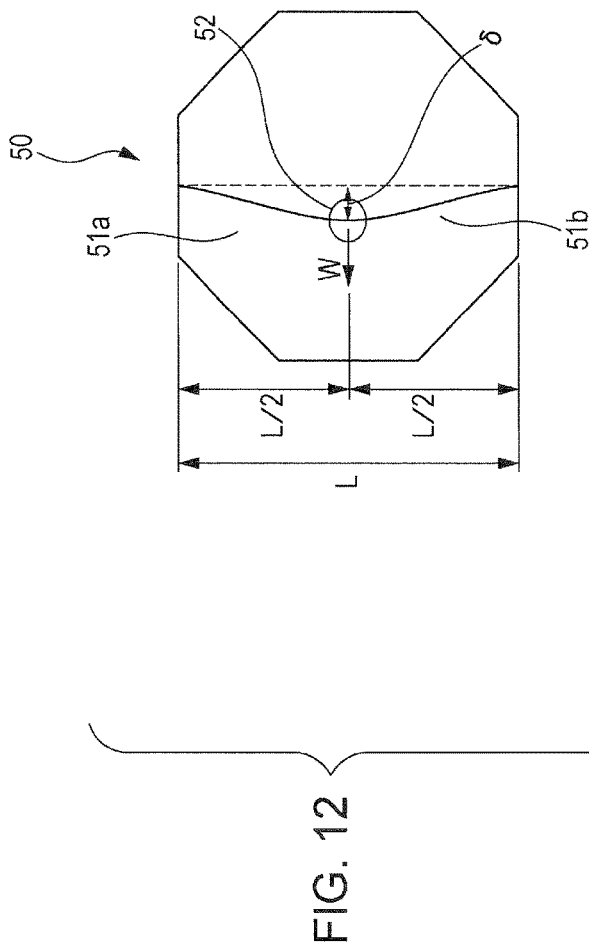

FIG. 12

FORMULA (2)  $k = \dfrac{W}{\delta}$

FORMULA (3)  $\delta = \dfrac{W \cdot L^3}{192 \cdot E \cdot I}$

FORMULA (4)  $k = \dfrac{192 \cdot E \cdot I}{L^3}$

FORMULA (5)  $\omega_{50} = \dfrac{1}{2\pi}\sqrt{\dfrac{192 \cdot E \cdot I}{m \cdot L^3}}$ k: SPRING CONSTANT (BENDING STIFFNESS)
W: CONCENTRATED LOAD
δ: DISPLACEMENT
E: YOUNG'S MODULUS OF BEAM
L: LENGTH OF BEAM
I: CROSS-SECTIONAL SECOND MOMENT OF BEAM
m: MASS
ω: FIRST BENDING NATURAL FREQUENCY

DYNAMIC VIBRATION ABSORBER, FLEXURE, AND HEAD SUPPORT MECHANISM

BACKGROUND OF THE INVENTION

1. Field of the Invention

The present invention relates to a dynamic vibration absorber, a flexure, and a head support mechanism.

2. Description of the Related Art

In recent years, the recording density of magnetic disks provided in magnetic disk drives has been improved. Each of the magnetic disk drives is provided with a slider that includes a magnetic head for recording and reproducing data on or from the magnetic disk, and the slider is supported by a head support mechanism.

Along with the improvement of the recording density, vibration suppression performance is demanded of the head support mechanism in order to avoid a position deviation between a magnetic head and a target track due to resonance of a load beam, excited by residual vibration in seeking as recording and reproducing of data is performed or an air flow generated as a magnetic disk rotates.

To cope with such a demand, a head suspension has been devised that includes a small-sized dynamic vibration absorber having a function of suppressing vibration with a specific frequency in order to be able to position the magnetic head at a target track on the magnetic disk with high accuracy by suppressing vibration.

For instance, Japanese Unexamined Patent Application Publication (JP-A) No. 2006-172568 discloses a head suspension mechanism that is provided with a suspension main frame including a head slider on which a magnetic head is mounted and an elastic cantilever thin plate that supports the head slider and applies a load force to the slider. In the head suspension mechanism described in JP-A No. 2006-172568, an additionally remaining part of each of flange sections serves as a free end, the flange sections being formed substantially upright at both edges, in the vicinity of a head slider support unit, of the suspension main frame. A dynamic vibration absorber is achieved by the length dimension of each flange section and an attenuation effect of an elastic material provided at each free end. Also, Japanese Patent No. 4838751 discloses a head suspension mechanism in which a cantilever beam having a dynamic vibration absorption function, serving as an additional vibration system includes a mass unit and an elastic unit of a dynamic vibration absorber that are formed at a central portion of the tip end of the suspension.

SUMMARY OF THE INVENTION

However, in the technique disclosed in JP-A No. 2006-172568, the suspension main frame is formed of a thin metal plate and the natural frequency of the dynamic vibration absorber is designed to resonate with a frequency range of vibration to be suppressed by using the length dimension of a beam section serving as the free end, and therefore, the length of the beam section has to be strictly set. For this reason, the elasticity and mass, which determine the natural frequency of the dynamic vibration absorber, may not be independently set, thereby resulting in a less degree of freedom in setting, and a problem arises in that it is difficult to set a frequency of vibration to be absorbed by the dynamic vibration absorber.

With the technique disclosed in Japanese Patent No. 4838751, the additional vibration system having a vibration absorption function, provided by forming the mass unit and the elastic unit at a central portion of the tip end of the suspension, sets a frequency range of vibration to be suppressed, by using the length of the dynamic vibration absorber including a thin stainless plate material that forms a load beam, and the length and width of the elastic unit, and thus a problem arises in that the setting range of frequency of vibration to be absorbed by the dynamic vibration absorber is narrow.

The present invention has been made in view of the aforementioned problem and aims to provide a dynamic vibration absorber, a flexure, and a head support mechanism that allow a frequency to be easily set in a wide frequency range.

A dynamic vibration absorber according to the present invention includes: an arm section that includes an elastic unit; and a weight section that is connected to the arm section and includes a mass unit. The arm section and the weight section each include a plurality of stacked single-layer materials having different degrees of elasticity and specific gravities, and at least one of the single-layer materials of the arm section and at least one of the single-layer materials of the weight section are shared in common.

According to the present invention, at least one of the single-layer materials of the arm section and at least one of the single-layer materials of the weight section share the same single-layer material, and thus the elastic unit and the mass unit are continuously formed, that is, no structural boundary is provided between the elastic unit and the mass unit. Consequently, a frequency of vibration to be absorbed by the dynamic vibration absorber may be easily determined based on the elasticity of the arm section and the mass of the weight section.

In the dynamic vibration absorber according to the present invention, the arm section and the weight section each include a plurality of stacked single-layer materials having different degrees of elasticity and specific gravities, and thus it is possible to independently set the bending elasticity of the arm section and the mass of the weight section by adjusting not only the outer shape but also the number of stacked layers of single-layer material. Consequently, a frequency of vibration to be absorbed may be set in a wide frequency range.

Preferably, the at least one single-layer material, which is out of the single-layer materials of the weight section and shared in common with the single-layer materials of the arm section, may have one of patterns of a linear shape, a curved shape, a circular shape, and a polygonal shape or a geometric design pattern including a combination of the patterns. In this case, for a change in the elasticity of the arm section and the mass of the weight section due to the same dimensional error, the difference between change rates for the elasticity and mass is made smaller, thereby achieving a dynamic vibration absorber that has a highly stable frequency of vibration to be absorbed. Also, the pattern may be provided at one time in a process of forming the outer shape of the weight section and the arm section, and thus a dynamic vibration absorber may be provided without adding a new process.

Preferably, the at least one of the single-layer materials included in the arm section and the at least one of the single-layer materials included in the weight section may be composed of a material having viscoelasticity. In this case, it is possible to obtain an attenuation effect without attaching a viscoelastic body separately.

Preferably, the dynamic vibration absorber may include a plurality of the arm sections, and the arm sections may be each connected to the weight section. In this case, the elasticity of the arm section may be set in a wide range, and thus it is possible to expand the setting range of frequency of vibration to be absorbed by the dynamic vibration absorber, the frequency being determined based on the elasticity of the arm section and the mass of the weight section.

Preferably, the weight section may further include a mass adjustment mechanism including of a plurality of mass adjustment pads. In this case, the mass of the weight section may be set in a wide range, and thus it is possible to expand the setting range of frequency of vibration to be absorbed by the dynamic vibration absorber, the frequency being determined based on the elasticity of the arm section and the mass of the weight section.

A flexure according to the present invention is supported by a flexure substrate having elasticity and includes a flexible wiring substrate in which a conductive foil and an insulation layer are stacked, the flexure including: a main body; an opening provided in the main body; and a dynamic vibration absorber disposed in the opening. The dynamic vibration absorber includes an arm section including an elastic unit and a weight section that is connected to the arm section and includes a mass unit, and the arm section and the weight section each include a plurality of stacked single-layer materials having different degrees of elasticity and specific gravities, and at least one of the single-layer materials of the arm section and at least one of the single-layer materials of the weight section are shared in common.

According to the present invention, at least one of the single-layer materials of the arm section and at least one of the single-layer materials of the weight section share the same single-layer material, and thus the elastic unit and the mass unit are continuously formed, that is, no structural boundary is provided between the elastic unit and the mass unit. Consequently, a frequency of vibration to be absorbed by the dynamic vibration absorber may be easily determined based on the elasticity of the arm section and the mass of the weight section.

Also, in the flexure according to the present invention, the arm section and the weight section each include a plurality of stacked single-layer materials having different degrees of elasticity and specific gravities, and thus it is possible to independently set the bending elasticity of the arm section and the mass of the weight section by adjusting not only the outer shape but also the number of stacked layers of single-layer material. Consequently, a frequency of vibration to be absorbed by the dynamic vibration absorber may be set in a wide frequency range.

Preferably, the at least one of the single-layer materials of the arm section and the at least one of the single-layer materials of the weight section may be shared in common with one of the flexure substrate, the conductive foil, and the insulation layer. In this case, the main body of the flexure, the elastic unit, and the mass unit are continuously formed, that is, no structural boundary is provided between the main body of the flexure, the elastic unit, and the mass unit. Consequently, a frequency of vibration to be absorbed by the dynamic vibration absorber may be easily determined based on the elasticity of the arm section and the mass of the weight section.

Preferably, the at least one single-layer material, which is out of the single-layer materials of the weight section and shared in common with the single-layer materials of the arm section, may have one of patterns of a linear shape, a curved shape, a circular shape, and a polygonal shape or a geometric design pattern including a combination of the patterns. In this case, for a change in the elasticity of the arm section and the mass of the weight section due to the same dimensional error, the difference between change rates for the elasticity and mass is made smaller, thereby achieving a flexure including a dynamic vibration absorber that has a highly stable frequency of vibration to be absorbed. Also, the pattern may be provided at one time in a process of forming the outer shape of the weight section and the arm section, and thus a flexure including a dynamic vibration absorber may be provided without adding a new process.

Preferably, the at least one of the single-layer materials included in the arm section and the at least one of the single-layer materials included in the weight section may be composed of a material having viscoelasticity. In this case, it is possible to obtain an attenuation effect without attaching a viscoelastic body separately.

Preferably, the flexure may include a plurality of the arm sections, and the arm sections may be each connected to the weight section. In this case, the elasticity of the arm section may be adjusted in a wide range, and thus it is possible to expand the setting range of frequency of vibration to be absorbed by the dynamic vibration absorber, the frequency being determined based on the elasticity of the arm section and the mass of the weight section.

Preferably, the weight section may further include a mass adjustment mechanism including of a plurality of mass adjustment pads. In this case, the mass of the weight section may be adjusted in a wide range, and thus it is possible to expand the setting range of frequency of vibration to be absorbed by the dynamic vibration absorber, the frequency being determined based on the elasticity of the arm section and the mass of the weight section.

A head support mechanism according to the present invention includes: a slider including a head element; a load beam that applies a load to a disc surface of a target recording medium to which information is written; a support projection provided at a tip end of the load beam; a slider substrate that rotatably supports the slider around the support projection; a drive element that applies a rotational force to the slider substrate; and a flexure that is supported by a flexure substrate having elasticity and that includes a flexible wiring substrate in which a conductive foil and an insulation layer are stacked. The flexure includes a main body, an opening provided in the main body, and a dynamic vibration absorber disposed in the opening, the dynamic vibration absorber includes an arm section including an elastic unit, and a weight section that is connected to the arm section and includes a mass unit, and the arm section and the weight section each include a plurality of stacked single-layer materials having different degrees of elasticity and specific gravities, and at least one of the single-layer materials of the arm section and at least one of the single-layer materials of the weight section are shared in common.

According to the present invention, at least one of the single-layer materials of the arm section and at least one of the single-layer materials of the weight section share the same single-layer material, and thus the elastic unit and the mass unit are continuously formed, that is, no structural boundary is provided between the elastic unit and the mass unit. Consequently, a frequency of vibration to be absorbed by the dynamic vibration absorber may be easily determined based on the elasticity of the arm section and the mass of the weight section.

In the head support mechanism according to the present invention, the arm section and the weight section each include a plurality of stacked single-layer materials having different degrees of elasticity and specific gravities, and thus it is possible to independently set the bending elasticity of the arm section and the mass of the weight section by adjusting not only the outer shape but also the number of stacked layers of single-layer material. Consequently, a frequency of vibration to be absorbed by the dynamic vibration absorber may be easily set in a wide frequency range.

Preferably, the main body of the flexure is fixed to the load beam, and the at least one of the single-layer materials of the arm section and the at least one of the single-layer materials of the weight section may be shared in common with one of the flexure substrate, the conductive foil, and the insulation layer. In this case, the dynamic vibration absorber of the flexure is able to act on the load beam via the fixing portion, and the main body of the flexure, the elastic unit, and the mass unit are continuously formed, that is, no structural boundary is provided between the main body of the flexure, the elastic unit, and the mass unit. Consequently, a frequency of vibration to be absorbed by the dynamic vibration absorber may be easily determined based on the elasticity of the arm section and the mass of the weight section.

BRIEF DESCRIPTION OF THE DRAWINGS

FIG. 9 is a cross-sectional view illustrating a cross section of a portion of the flexure to which the first drive unit is bonded, the flexure being included in the head support mechanism equipped with the dynamic vibration absorber according to the preferred embodiment in the present invention.

FIG. 12 is a simplified model diagram of the dynamic vibration absorber according to the first embodiment in the present invention.

DESCRIPTION OF THE PREFERRED EMBODIMENTS

Hereinafter, a preferred embodiment in the present invention will be described with reference to the drawings. It is to be noted that the present invention is not limited to the following embodiments. The components described below include some components that readily occur to those skilled in the art or are essentially the same. In addition, the components described below may be combined as appropriate. Also, omission, replacement, and modification of the components may be made in various manners without departing from the spirit of the present invention.

Figure 1:
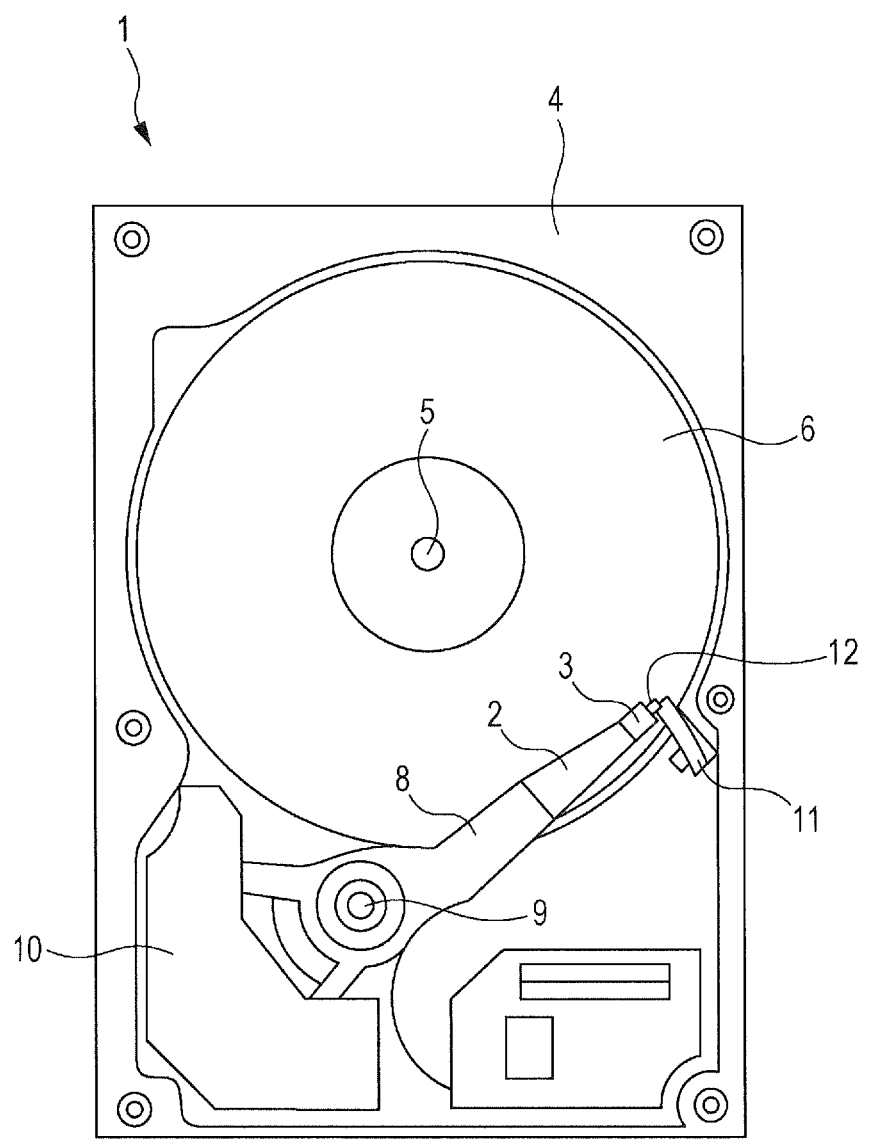
FIG. 1 is a schematic plan view of a magnetic disk drive including a head support mechanism equipped with a dynamic vibration absorber according to a preferred embodiment in the present invention.

FIG. 1 is a view schematically illustrating the entire configuration of a load/unload type magnetic disk drive (HDD device) including a head support mechanism equipped with a dynamic vibration absorber according to a preferred embodiment in the present invention. As seen from FIG. 1, the magnetic disk drive 1 includes a housing 4, a magnetic disk 6 that is rotationally driven around a shaft 5 by a spindle motor, a head support mechanism 2 having an end to which a slider 3 having a head element 7 is attached, and a support arm 8 that supports the head support mechanism 2 at the tip end.

The rear end of the support arm 8 is equipped with a coil section of a voice coil motor (VCM), and the support arm 8 is rotatable around a horizontal rotation shaft 9 parallel to the surface of the magnetic disk 6. The VCM includes the coil section (not illustrated) and a magnet section 10 that covers the coil section. A ramp mechanism 11 is provided between an outward position of the data area of the magnetic disk 6 and an outward position of the magnetic disk 6. When a tab 12 provided at the tip end of the head support mechanism 2 is lifted up the inclined surface of the ramp mechanism 11, the slider 3 is caused to be separated from the magnetic disk 6, and thus the slider 3 is set in an unload state.

When the magnetic disk drive 1 is in operation (during high speed rotation of the magnetic disk), the slider 3 faces the surface of the magnetic disk 6 and floats at a low height, and so is in a load state. On the other hand, when the magnetic disk drive 1 is not in operation (when the magnetic disk is at rest or during low speed rotation of the magnetic disk at start or stop), the tab 12 at the tip end of the head support mechanism 2 is on the ramp mechanism 11, and so the slider 3 is in an unload state.

Figure 2:
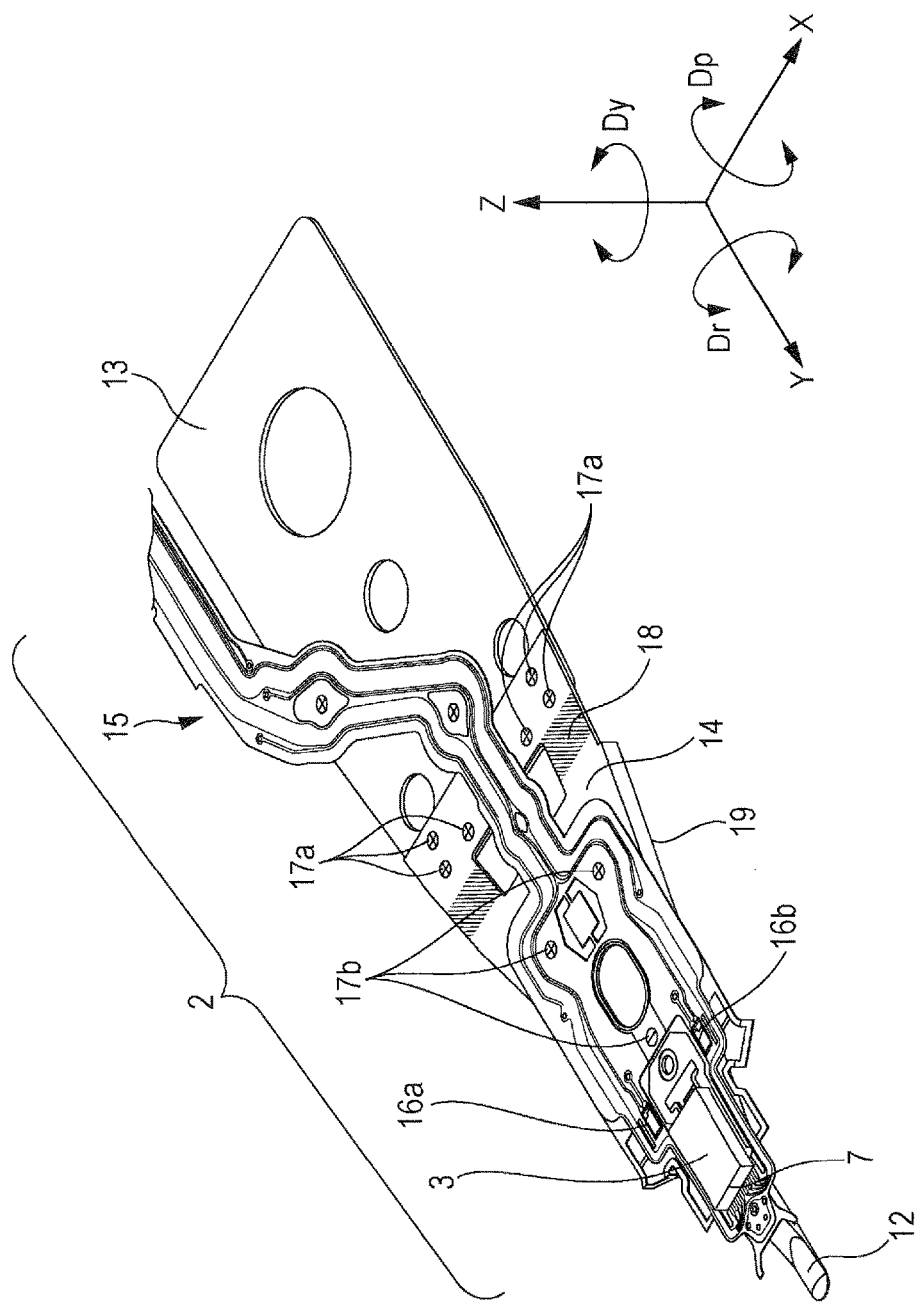
FIG. 2 is a perspective view of the head support mechanism equipped with the dynamic vibration absorber according to the preferred embodiment in the present invention.

FIG. 2 is a perspective view schematically illustrating the entire configuration of the head support mechanism equipped with a dynamic vibration absorber according to the preferred embodiment of the present invention. Hereinafter, for the sake of convenience of description, positive Z-axis direction in FIG. 2 is referred to as the upper surface side of the head support mechanism 2, and negative Z-axis direction is referred to as the rear surface side or the lower surface side of the head support mechanism 2. The slider 3 is provided with the head element 7 at the rear end (trailing edge, positive Y-axis direction in FIG. 2) face of the slider 3, the head element 7 including an inductive write head element and an MR read thin film magnetic head such as a giant magneto-resistance (GMR) read head element or a tunnel magneto-resistive effect (TMR) read head element.

As seen from FIG. 2, the head support mechanism 2 includes, as its main components, a base plate 13, a load beam 14, a flexure 15, a drive element 16, and the slider 3. Also, the base plate 13 is mounted on the tip end of the support arm 8.

As seen from FIG. 2, the load beam 14 is fixed to the base plate 13 via a plurality of first beam welding points 17a. Also, a leaf spring 18 is formed in the load beam 14 so as to apply a load to the disc surface of a target recording medium to which the slider 3 writes information. In addition, the load beam 14 has undergone processing to have bent parts 19 on both sides to achieve a structure having increased strength. The flexure 15 is fixed to the load beam 14 via a plurality of second beam welding points 17b. It is to be noted that in FIG. 2, the pitch direction, the roll direction, and the yaw direction of the attitude angle of the slider 3 are denoted by Dp, Dr, and Dy, respectively.

Figure 3:
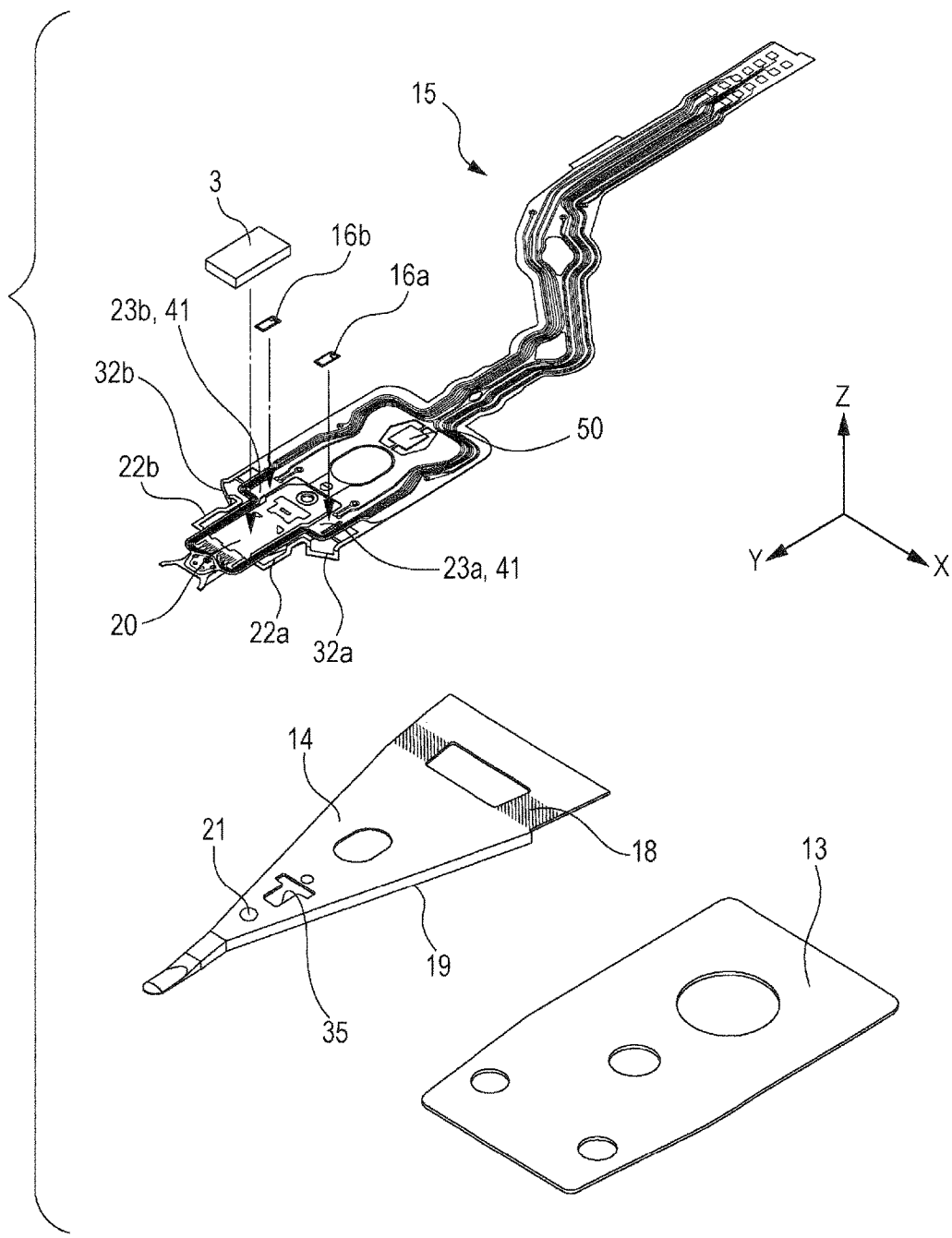
FIG. 3 is an exploded perspective view of the head support mechanism equipped with the dynamic vibration absorber according to the preferred embodiment in the present invention.
Figure 4:
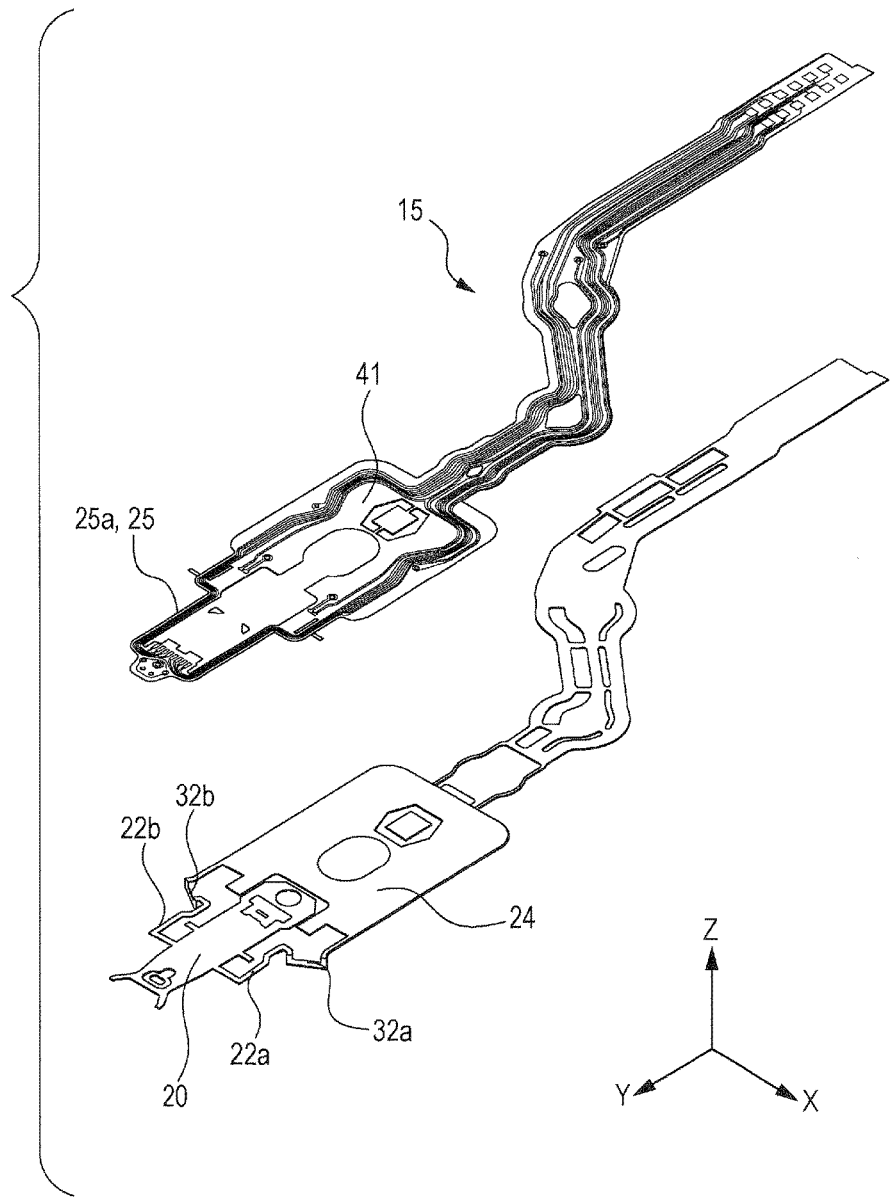
FIG. 4 is an exploded perspective view of a flexure having the dynamic vibration absorber according to the preferred embodiment in the present invention.

FIG. 3 is an exploded perspective view schematically illustrating the head support mechanism equipped with the dynamic vibration absorber according to the preferred embodiment in the present invention. FIG. 4 is an exploded perspective view illustrating the configuration of a flexure having the dynamic vibration absorber according to the preferred embodiment in the present invention. It is to be noted that FIG. 3 illustrates the manner in which the head support mechanism 2 is exploded into the load beam 14, the flexure 15, the base plate 13, the drive element 16, and the slider 3.

As seen from FIG. 3, the slider 3 is bonded and fixed on a slider substrate 20 formed in the flexure 15. A support projection 21 is formed integrally with the load beam 14 on the center line of the vicinity of the tip end of the load beam 14, thereby forming a pivot structure in which the support projection 21 is in point contact with the slider substrate 20 which is supported by a first outrigger 22a and a second outrigger 22b. This structure allows the slider 3 to smoothly maintain a floating posture according to the curvature of the disk surface. In other words, the slider substrate 20 rotatably supports the slider 3 around the support projection 21.

In general, the flexure 15 includes a flexible wiring substrate in which an insulating layer 41 and a conductive foil 25 are stacked, the insulating layer 41 being coated on an elastic flexure substrate 24 including a thin stainless steel plate with a thickness of approximately 20 μm, the conductive foil 25 forming a head element wiring 25a (wiring section) on the insulating layer 41 using a material on which a copper foil is plated. Here, the outer shape and the wiring configuration of the flexible wiring substrate having the flexure substrate 24 and the head element wiring 25a may be precision-processed into any shape by an etching process. It is to be noted that although the flexure 15 is originally integrated, in FIG. 4, the stainless steel flexure substrate 24 and the head element wiring 25a (wiring section) formed on the insulating layer 41 are separately illustrated for the sake of easy understanding.

The drive element 16 is a thin film piezoelectric element and has a function of applying a rotational force to the slider substrate 20. Specifically, the drive element 16 includes a first drive unit 16a and a second drive unit 16b that are bonded onto a first piezoelectric body supporter 23a and a second piezoelectric body supporter 23b, respectively. It is to be noted that the first piezoelectric body supporter 23a and the second piezoelectric body supporter 23b are formed of only the insulating layer 41 which is included in the flexure 15.

Figure 5A:
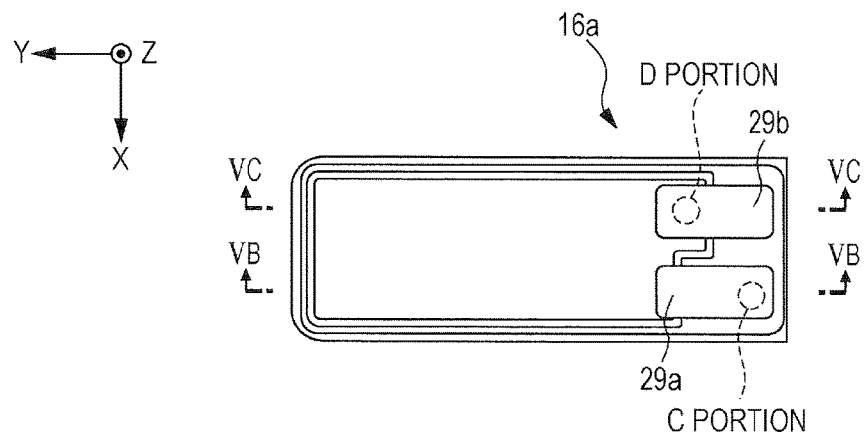
FIG. 5A is a plan view of a first drive unit included in the head support mechanism equipped with the dynamic vibration absorber according to the preferred embodiment in the present invention.
Figure 5B:
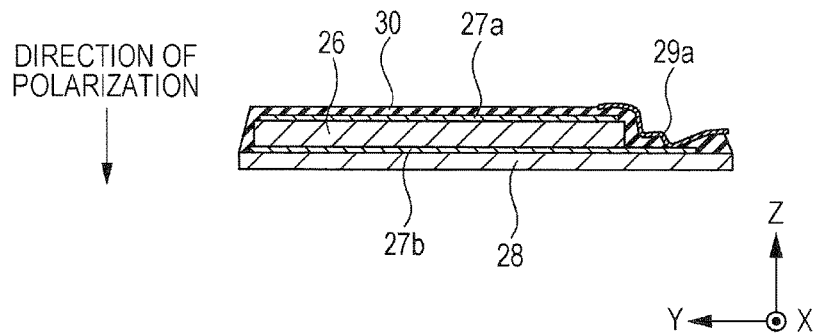
FIG. 5B is a cross-sectional view taken along line VB-VB in FIG. 5A.
Figure 5C:
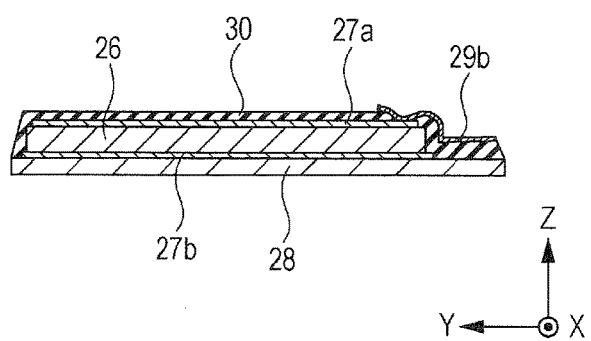
FIG. 5C is a cross-sectional view taken along line VC-VC in FIG. 5A.

FIG. 5A is a plan view of the first drive unit included in the head support mechanism equipped with the dynamic vibration absorber according to the preferred embodiment in the present invention. FIG. 5B is a cross-sectional view taken along VB-VB in FIG. 5A and FIG. 5C is a cross-sectional view taken along VC-VC in FIG. 5A. The structures of the first driving unit 16a and the second driving unit 16b are the same, and thus only the structure of the first driving unit 16a will be described below. In the first driving unit 16a, an upper electrode 27a is formed on the upper surface of a thin film piezoelectric body 26, and a lower electrode 27b is formed beneath the lower surface of the thin film piezoelectric body 26. Because the first drive unit 16a and the second drive unit 16b are very thin and easily damaged, a base 28 is provided as a reinforcing member.

In order to protect the thin film piezoelectric body 26, the entire first drive unit 16a is covered with an insulating cover 30 made of polyimide. It is to be noted that the insulating cover 30 is partially removed in C portion and D portion in FIG. 5A. Specifically, in the C portion, the lower electrode 27b is exposed and electrically connected to a first electrode pad 29a. In the D portion, the upper electrode 27a is exposed and electrically connected to a second electrode pad 29b. Thus, application of a voltage to the first electrode pad 29a, the second electrode pad 29b causes the thin film piezoelectric body 26 of the first drive unit 16a to expand and contract. The polarization direction of the thin film piezoelectric body 26 is indicated by an arrow. When a negative voltage is applied to the first electrode pad 29a and a positive voltage is applied to the second electrode pad 29b, the thin film piezoelectric body 26 contracts in a direction inward from the surface of the piezoelectric film due to a piezoelectric constant d31. It is to be noted that although the second drive unit 16b having the same structure as the first drive unit 16a is not illustrated, when a negative voltage is applied to a third electrode pad 29c corresponding to the first electrode pad 29a and a positive voltage is applied to a fourth electrode pad 29d corresponding to the second electrode pad 29b, the thin film piezoelectric body 26 contracts in a direction inward from the surface of the piezoelectric film due to a piezoelectric constant d31.

Figure 6:
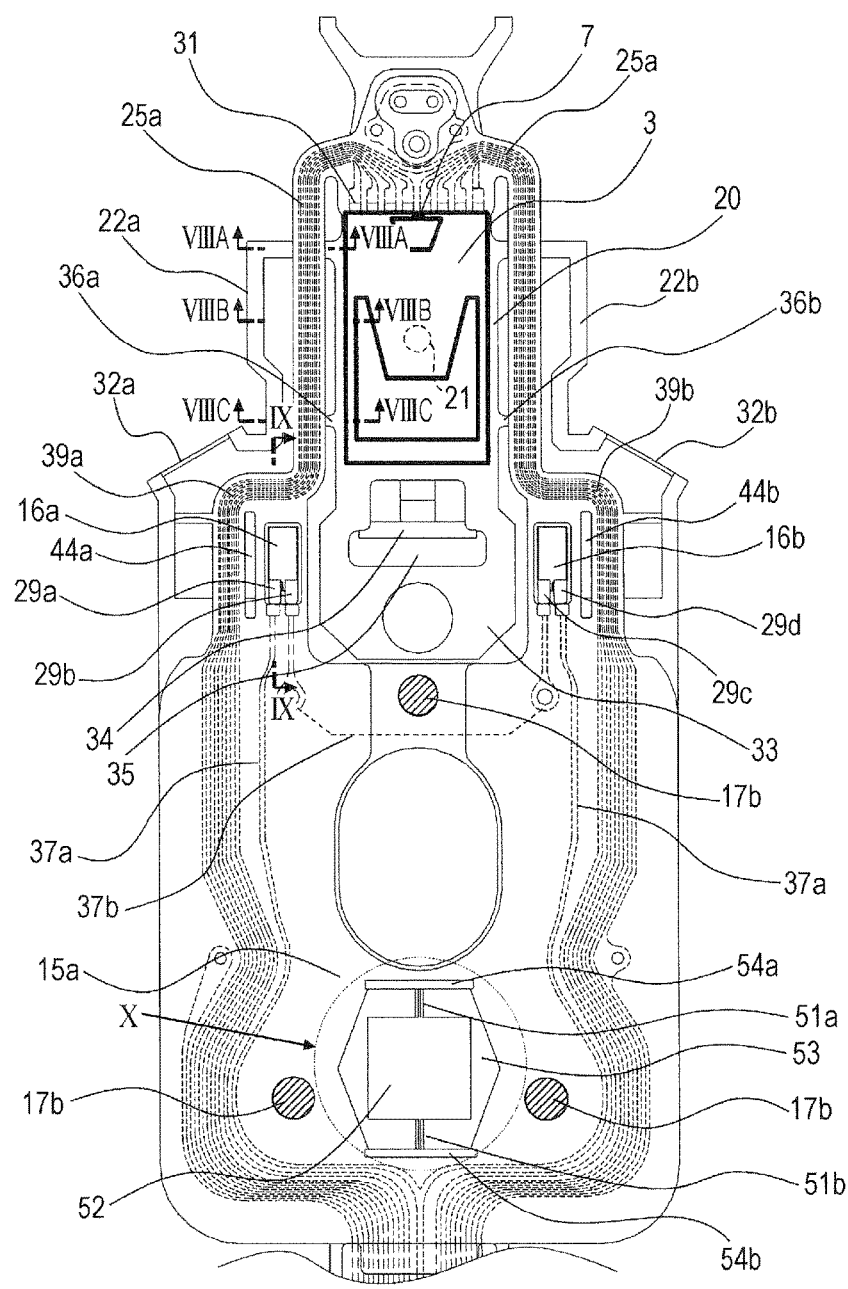
FIG. 6 is a plan view from the upper surface side of the main tip end of the head support mechanism equipped with the dynamic vibration absorber according to the preferred embodiment in the present invention.
Figure 7:
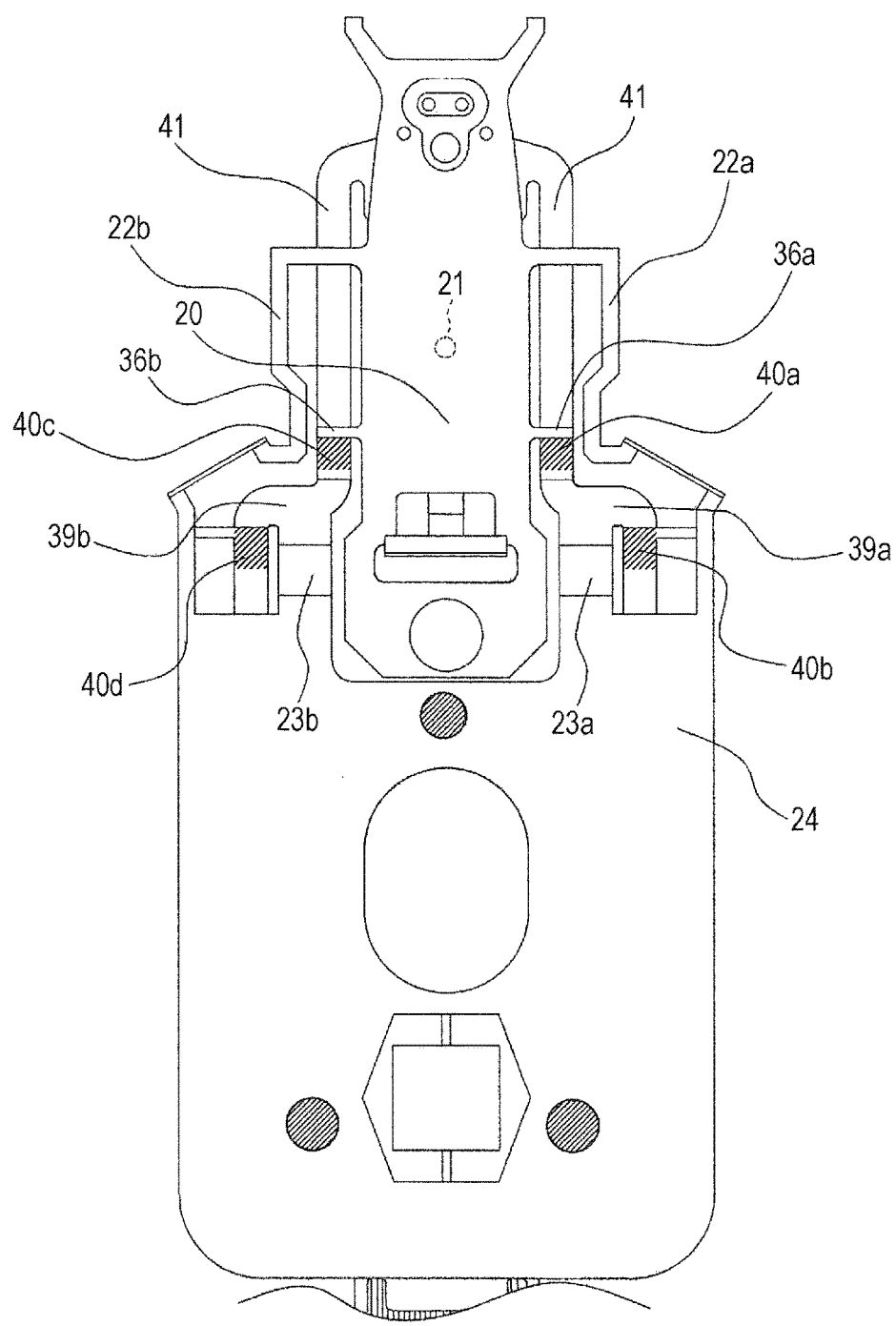
FIG. 7 is a plan view from the lower surface side of the main tip end of the head support mechanism equipped with the dynamic vibration absorber according to the preferred embodiment in the present invention.

FIG. 6 is a plan view from the upper surface side (slider side) of the main tip end of the head support mechanism equipped with the dynamic vibration absorber according to the preferred embodiment in the present invention. FIG. 7 is a plan view from the back surface side of the main tip end of the head support mechanism (a plan view of the head support mechanism of FIG. 6 as seen from the back surface side) equipped with the dynamic vibration absorber according to the preferred embodiment in the present invention. It is to be noted that the load beam 14 is excluded from FIGS. 6 and 7 for convenience of description. The slider 3 is bonded onto the slider substrate 20, and the head element wiring 25a (wiring section) corresponding to a head electrode terminal 31 is installed and connected by a solder ball.

In FIG. 6, in the first and second outriggers 22a, 22b disposed on both sides of the slider substrate 20, a first bent part 32a and a second bent part 32b are partially formed. In addition, the support projection 21 is designed to be located at the intersection point of lines extended from the first and second bent parts 32a, 32b on the right and left. Also, the slider substrate 20 is designed to be rotated around the support projection 21 due to the operation of the first bent part 32a, the second bent part 32b that are each provided at an intermediate position of the first and second outriggers 22a, 22b, respectively.

The slider substrate 20 has a counterbalance 33 that is set so that the support projection 21 is aligned with an axis of inertia in a yaw direction of the rotatable part including the slider 3. In addition, the slider substrate 20 has a T type limiter 34 which is engaged with a hole 35 formed in the load beam 14 and which lifts the slider 3 up when the slider 3 is unloaded from the disk. At the time of normal operation, the T type limiter 34 and the hole 35 are not in contact with each other with a gap therebetween.

The head element wiring 25a (wiring section) is disposed so as to surround the slider 3 and the tip end of the head element wiring 25a is connected to the head electrode terminal 31 of the slider 3. The head element wiring 25a (wiring section) is fixed to the first and second outriggers 22a, 22b (VIIIA-VIIIA portion of FIG. 6) as well as a first drive rib 36a and a second drive rib 36b that extend from the slider substrate 20 (VIIIC-VIIIC portion of FIG. 6) in the same manner.

The first drive unit 16a and the second drive unit 16b are driven by applying a voltage to first, second, third, fourth electrode pads 29a, 29b, 29c, 29d. The driver wire 37a is disposed to apply an input to the first electrode pad 29a of the first drive unit 16a and the fourth electrode pad 29d of the second drive unit 16b. The second electrode pad 29b and the third electrode pad 29c are grounded to the flexure substrate via a grand wiring 37b. When an alternating drive signal is inputted to the driver wire 37a, the first drive unit 16a and the second drive unit 16b produce expansion and contraction motion in mutually opposite directions.

Figure 8A:
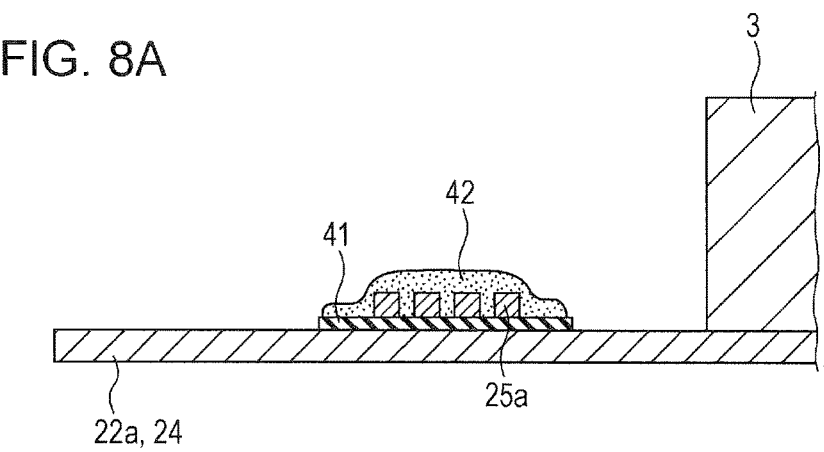
FIG. 8A is a cross-sectional view taken along line VIIIA-VIIIA in FIG. 6.
Figure 8B:
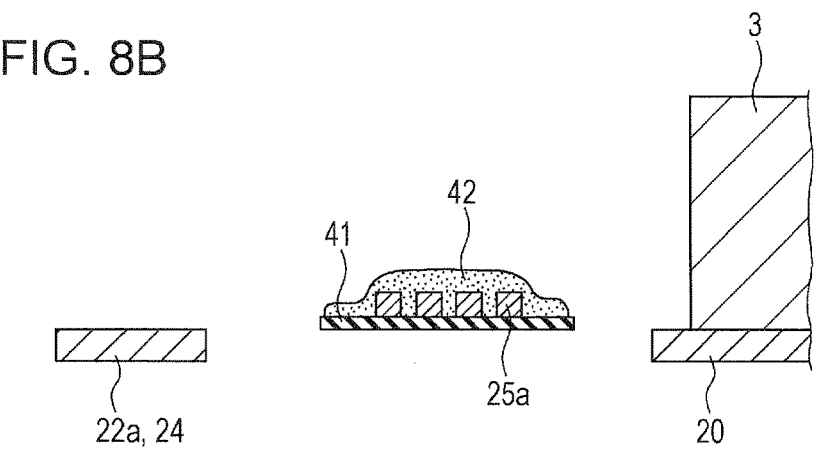
FIG. 8B is a cross-sectional view taken along line VIIIB-VIIIB in FIG. 6.
Figure 8C:
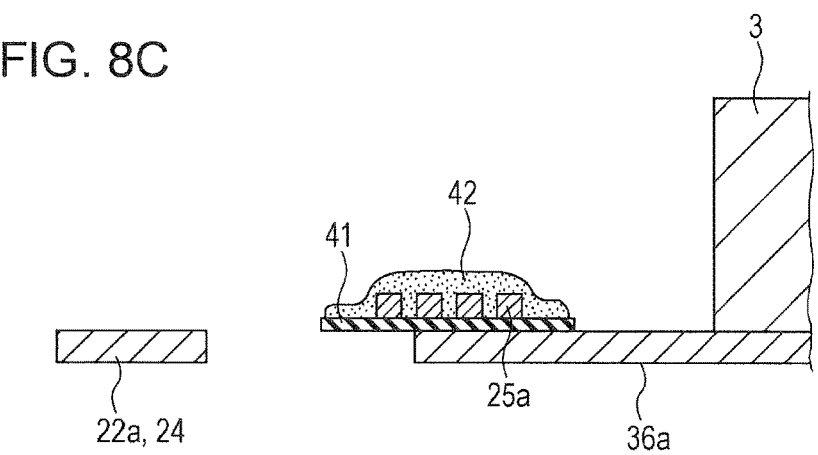
FIG. 8C is a cross-sectional view taken along line VIIIC-VIIIC in FIG. 6.

The structure of the flexure 15 depicted in FIG. 6 (FIG. 7) is illustrated with reference to FIGS. 8A to 8C each for a cross-sectional view. FIG. 8A is a cross-sectional view taken along line VIIIA-VIIIA in FIG. 6, FIG. 8B is a cross-sectional view taken along line VIIIB-VIIIB in FIG. 6, and FIG. 8C is a cross-sectional view taken along VIIIC-VIIIC in FIG. 6. As seen from FIG. 8A, the first outrigger 22a is formed of the flexure substrate 24 and disposed to be connected to the slider substrate 20. As seen from FIG. 8B, the flexure substrate 24 on the back surface side of the head element wiring 25a is removed by an etching process, and the slider substrate 20, the first outrigger 22a, and the head element wiring 25a are separated. As seen from FIG. 8C, the first drive rib 36a which is extended from the slider substrate 20 as part of the flexure substrate 24 and part of the head element wiring 25a are fixed to each other.

FIG. 9 is a cross-sectional view (IX-IX cross section in FIG. 6) of a portion where the first drive unit is bonded to the flexure in the head support mechanism equipped with the dynamic vibration absorber according to the preferred embodiment in the present invention. The first drive unit 16a is bonded onto the first piezoelectric body supporter 23a at a position where the tip end of the first drive unit 16a is overlapped with a first link 39a which is formed by leaving part of the flexure substrate 24. This is for the purpose of reliably transmitting a displacement of the thin film piezoelectric body 26 to the first link 39a. It is to be noted that although the second drive unit 16b having the same structure as the first drive unit 16a is not illustrated, the second drive unit 16b is bonded onto the second piezoelectric body supporter 23b at a position where the tip end of the second drive unit 16b is overlapped with a second link 39b which is formed by leaving part of the flexure substrate 24, and thus a displacement of the thin film piezoelectric body 26 is reliably transmitted to the second link 39b.

In FIG. 7, the first link 39a is disposed to connect between a first joint 40a and a second joint 40b. The first joint 40a and the second joint 40b are formed by part of the head element wiring 25a (wiring section) in which the flexure substrate 24 of the flexure 15 has been removed by etching. The first joint 40a and the second joint 40b are made more flexible compared with the first link 39a that includes the flexure substrate 24, and expansion and contraction motion of the first drive unit 16a causes the first link 39a to finely rotate around the second joint 40b. Similarly, the second link 39b is disposed to connect between a third joint 40c and a fourth joint 40d, and the third and fourth joints 40c, 40d have the same structure as the first and second joints 40a, 40b, and thus expansion and contraction motion of the second drive unit 16b causes the second link 39b to finely rotate around the fourth joint 40d.

It is to be noted that the base plate 13 and the load beam 14 of the head support mechanism 2 are each symmetrical with respect to a central axis which is parallel to the direction of the Y-axis in each Figure. Similarly, the first link 39a and second link 39b, the first joint 40a, second joint 40b, third joint 40c, and fourth joint 40d, and the first drive unit 16a and the second drive unit 16b each have a symmetrical structure with respect to a central axis which is parallel to the direction of the Y-axis in each Figure.

In FIGS. 6 and 7, a first separation groove 44a is provided to separate the first drive unit 16a from the second joint 40b and the flexure substrate 24. The first separation groove 44a is formed in a range corresponding to the length of the thin film piezoelectric body 26 in the longitudinal direction (the Y-axis direction in Figure). The first separation groove 44a enables the displacement of the thin film piezoelectric body 26 to be maximized by releasing the restriction due to the second joint 40b including the head element wiring 25a (wiring section), and the flexure substrate 24. It is to be noted that this is also the case with a second separation groove 44b as seen from FIG. 6 because the head support mechanism 2 has a symmetrical shape with respect to a symmetrical axis parallel to the Y-axis.

First Embodiment

Figure 10:
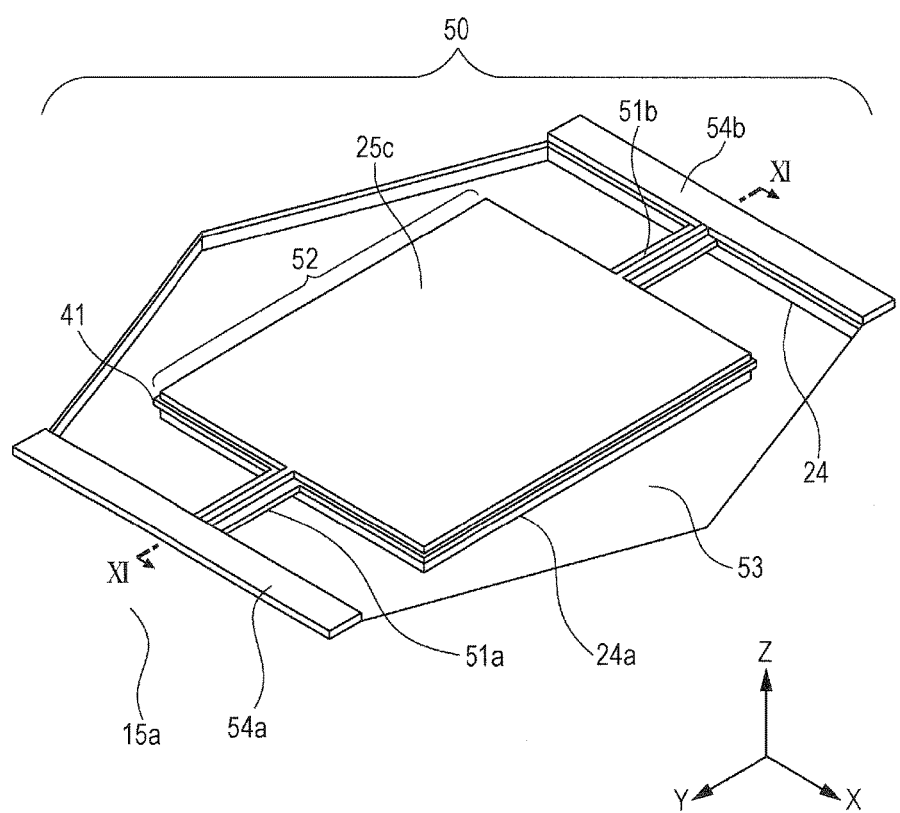
FIG. 10 is an enlarged perspective view of a dynamic vibration absorber in a head support mechanism including a flexure having the dynamic vibration absorber according to a first embodiment in the present invention.
Figure 11:
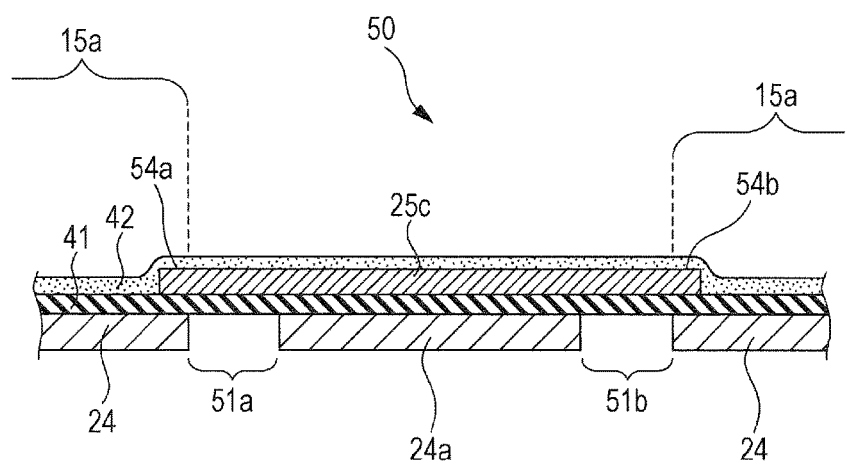
FIG. 11 is a cross-sectional view taken along line XI-XI in FIG. 10.

FIG. 10 is an enlarged perspective view (enlarged perspective view illustrating area X in FIG. 6 with an enlarged scale) of a dynamic vibration absorber in a head support mechanism including a flexure having the dynamic vibration absorber according to a first embodiment in the present invention. FIG. 11 is a cross-sectional view taken along line XI-XI in FIG. 10. The flexure 15 has a main body 15a of the flexure 15, an opening 53, and a dynamic vibration absorber 50. The main body 15a is fixed to the load beam 14 via the second beam welding points 17b. The opening 53 is formed in the main body 15a. Specifically, the opening 53 is provided in the vicinity of the beam welding points 17b where the load beam 14 and the main body 15a are fixed to each other. In the present embodiment, the opening 53 is hexagonal. However, without being limited to this, the opening 53 may be circular or quadrilateral.

The dynamic vibration absorber 50 is disposed in approximately the center of the opening 53, and includes a weight section 52 and an arm section 51. In the present embodiment, the weight section 52 includes the flexure substrate 24 in a substantially square shape, the insulating layer 41 in a substantially square shape provided on the flexure substrate 24, and the conductive foil 25 in a substantially square shape provided on the insulating layer 41. That is, the weight section 52 includes a plurality of stacked single-layer materials having different degrees of elasticity and specific gravities. It is to be noted that in the present embodiment, the flexure substrate 24 is processed in an etching process, the weight section 52 remains without being removed in the etching process and a square island-shaped pattern 25c composed of the conductive foil 25 is formed. Also, an island-shaped pattern 24a formed of the flexure substrate 24 and the island-shaped pattern 25c of the conductive foil 25 have the same length of each side and the same outer shape of the flexure 15 in a planar direction (the XY-plane direction). However, without being limited to this, the island-shaped pattern 24a in the flexure substrate 24 and the island-shaped pattern 25c of the conductive foil 25 may have different shapes for mass adjustment.

The weight section 52 is supported by the arm section 51. Specifically, the arm section 51 includes a first arm section 51a and a second arm section 51b between which the weight section 52 is interposed, the first arm section 51a extending in one direction (in the direction to the tip end of the head support mechanism 2), the second arm section 51b extending to the opposite side (the base plate side) from the first arm section 51a. The first arm section 51a has one end connected to the weight section 52 and the other end connected to the main body 15a of the flexure 15. Similarly, the second arm section 51b has one end connected to the weight section 52 and the other end connected to the main body 15a. That is, the dynamic vibration absorber 50 has a structure equivalent to a both end fixed beam which has the weight section 52 as a concentrated mass in the middle. In the present embodiment, the width of the first and second arm sections 51a, 51b in the perpendicular direction (the X-axis direction in FIG. 10) to the extending direction of the arm sections is narrower than the width of the weight section 52 in the perpendicular direction (the X-axis direction in FIG. 10) to the extending direction of the first and second arm sections 51a, 51b. The first and second arm sections 51a, 51b include the insulating layer 41 in a rectangular shape, and the conductive foil 25 in a rectangular shape provided on the insulating layer 41, and constitute an elastic unit of the dynamic vibration absorber 50. That is, the first and second arm sections 51a, 51b each include a plurality of stacked single-layer materials having different degrees of elasticity and specific gravities. The insulating layer 41 and the conductive foil 25 included in the first and second arm sections 51a, 51b are not removed and left in the etching process, thereby being formed. On the other hand, the flexure substrate 24 on the back surface of the insulating layer 41 of the first and second arm sections 51a, 51b is removed in the etching process. Therefore, the first and second arm sections 51a, 51b have a lower bending elasticity than that of the main body 15a and the weight section 52.

In the present embodiment, the insulating layer 41 and the conductive foil 25 are the same members in common between the first and second arm sections 51a, 51b and the weight section 52. That is, in the present embodiment, two of the plurality of single-layer materials (the insulating layer 41, the conductive foil 25) of the first and second arm sections 51a, 51b, and of the plurality of single-layer materials (the flexure substrate 24, the insulating layer 41, the conductive foil 25) of the weight section 52 are the same single-layer materials shared in common. In other words, the flexure substrate 24 is removed by the etching process in the first and second arm sections 51a, 51b and thus is the single-layer material not shared in common between the arm sections 51a, 51b and the weight section 52. It is to be noted that the conductive foil 25 included in the first and second arm sections 51a, 51b and the conductive foil 25 included in the weight section 52 are covered with a wiring cover 42. In the present embodiment, the conductive foil 25 and the insulating layer 41 in the first and second arm sections 51a, 51b and the weight section 52 share the same single-layer material with the main body 15a of the flexure 15, and may be processed to form the outer shape integrally with the flexure 15 in the process of forming the outer shape of the flexure 15. Therefore, the main body 15a, the first and second arm sections 51a, 51b as the elastic units, and the weight section 52 as the mass unit are continuously formed, that is, no structural boundary is provided between the main body 15a, the first and second arm sections 51a, 51b as the elastic units, and the weight section 52 as the mass unit, thereby allowing a resonance frequency of the dynamic vibration absorber 50 to be easily set with sufficient accuracy based on the elasticity of the first and second arm sections 51a, 51b and the mass of the weight section 52. Consequently, additional processing for providing the dynamic vibration absorber 50 is not needed in the outer shape processing for the flexure 15.

Furthermore, in the present embodiment, the main body 15a of the flexure 15 is connected to the other ends of the first and second arm sections 51a, 51b and has first and second arm supporters 54a, 54b that support the first and second arm sections 51a, 51b. Specifically, the first and second arm supporters 54a, 54b include the conductive foil 25 and are connected to the conductive foil 25 included in the first and second arm sections 51a, 51b. The width of the first and second arm supporters 54a, 54b in the perpendicular direction (the X-axis direction in FIG. 10) to the extending direction of the first and second arm sections 51a, 51b is wider than the width of the first and second arm sections 51a, 51b in the perpendicular direction (the X-axis direction in FIG. 10) to the extending direction of the first and second arm sections 51a, 51b.

In this manner, the dynamic vibration absorber 50 absorbs the vibration excited by the load beam 14, thereby making it possible to achieve the head support mechanism 2 having high vibration suppression performance. Therefore, the sway mode, which is one of vibration modes of the load beam 14, may be efficiently suppressed. Here, the spring constants of the first and second arm sections 51a, 51b are adjusted by the lengths of the first and second arm sections 51a, 51b in their extending direction (the Y-axis direction in FIG. 10) and the widths of the first and second arm sections 51a, 51b in the perpendicular direction (the X-axis direction in FIG. 10) to the extending direction, and the mass of the weight section 52 is set by the area of the weight section 52. It is to be noted that in the present embodiment, the center of the weight section 52 is located on the center line of the load beam 14, and the first and second arm sections 51a, 51b are disposed to be symmetric with respect to a symmetrical axis (the Y-axis direction in FIG. 10) parallel to the center line of the load beam 14.

Furthermore, the insulating layer 41 and the wiring cover 42 are preferably composed of a material having viscoelasticity. That is, one single-layer material common between the plurality of single-layer materials (the insulating layer 41, the conductive foil 25) included in the first and second arm sections 51a, 51b and the plurality of single-layer materials (the flexure substrate 24, the insulating layer 41, the conductive foil 25) of the weight section 52 is a material having viscoelasticity. Thus the first and second arm sections 51a, 51b include the conductive foil 25 composed of metal and the insulating layer 41 and the wiring cover 42 having viscoelasticity, and have a structure similar to an unconstrained type vibration suppression plate. Consequently, it is possible to obtain an attenuation effect without attaching a viscoelastic body separately. Materials having viscoelasticity include a resin material such as polyimide which has higher viscoelasticity than that of metal.

FIG. 12 is a simplified model diagram of the dynamic vibration absorber according to the first embodiment in the present invention. Since the weight section 52 is supported by the first and second arm sections 51a, 51b from two directions, and thus the dynamic vibration absorber 50 may be regarded as a both end fixed beam having a concentrated mass in the middle as described above. In general, a frequency absorbed by the dynamic vibration absorber 50 is a resonance frequency of the dynamic vibration absorber 50, and resonates with the natural frequency of the dynamic vibration absorber 50. At this point, the first bending natural frequency of the dynamic vibration absorber 50 is expressed by the following Formula (1) where $\omega_{50}$ is the natural frequency, k is the spring constant (bending elasticity), and m is the mass.

$$\omega_{50} = \frac{1}{2\pi}\sqrt{\frac{k}{m}} \qquad \text{Formula (1)}$$

On the other hand, the spring constant k is expressed by the following Formula (2) where W is the concentrated load applied to the middle point of a both end fixed beam and $\delta$ is a displacement.

$$k = \frac{W}{\delta} \qquad \text{Formula (2)}$$

Also, let L be the length of a both-end fixed beam, E be Young's modulus of beam, and I be the cross-sectional second moment of beam, then the displacement $\delta$ is expressed by the following Formula (3).

$$\delta = \frac{W \cdot L^3}{192 \cdot E \cdot I} \qquad \text{Formula (3)}$$

Substituting Formula (3) into Formula (2) gives the following Formula (4).

$$k = \frac{192 \cdot E \cdot I}{L^3} \qquad \text{Formula (4)}$$

Substituting Formula (4) into Formula (1) gives the following Formula (5) for the natural frequency $\omega_{50}$ of the dynamic vibration absorber 50.

$$\omega_{50} = \frac{1}{2\pi}\sqrt{\frac{192 \cdot E \cdot I}{m \cdot L^3}} \qquad \text{Formula (5)}$$

That is, it is possible to adjust the natural frequency $\omega_{50}$ of the dynamic vibration absorber 50 by Formula (5) using Young's modulus E of the first and second arm sections 51a, 51b serving as beams, the cross-sectional second moment of beams I, and the mass m. It is to be noted that a coefficient of viscosity is not taken into consideration.

As described above, the dynamic vibration absorber 50 according to the present embodiment has a configuration in which at least one of the single-layer materials of the arm section 51 and at least one of the single-layer materials of the weight section 52 are shared in common. Therefore, the elastic unit and the mass unit are continuously formed, that is, no structural boundary is provided between the elastic unit and the mass unit. Consequently, a frequency may be easily determined based on the elasticity of the arm section 51 and the mass of the weight section 52.

In addition, in the dynamic vibration absorber 50 according to the present embodiment, the arm section 51 and the weight section 52 each include a plurality of stacked single-layer materials having different degrees of elasticity and specific gravities, and thus it is possible to independently set the bending elasticity of the arm section 51 and the mass of the weight section 52 by adjusting not only the outer shape but also the number of stacked layers of single-layer material. Consequently, a frequency of vibration to be absorbed may be set in a wide frequency range.

Furthermore, the dynamic vibration absorber 50 according to the present embodiment includes a plurality of arm sections 51, and the arm sections 51a, 51b are each connected to the weight section 52. Consequently, the elasticity of the arm sections 51a, 51b may be adjusted in a wide range, and thus it is possible to expand the setting range of frequency of vibration to be absorbed by the dynamic vibration absorber 50, the frequency being determined based on the elasticity of the arm sections 51a, 51b and the mass of the weight section 52. Although the first and second arm sections 51a, 51b are each formed of a single beam in the present embodiment, each arm section may be formed of a plurality of beams.

Second Embodiment

Figure 13:
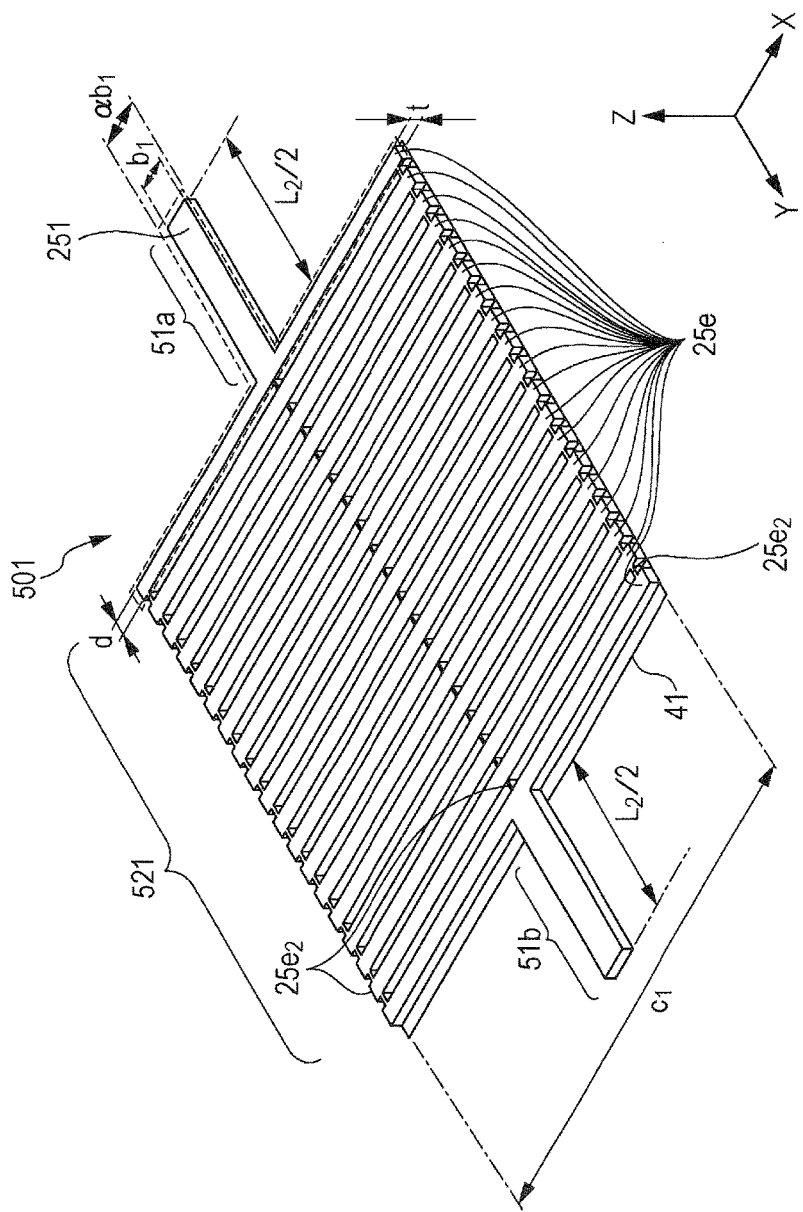
FIG. 13 is a schematic perspective view illustrating a dynamic vibration absorber according to a second embodiment in the present invention.

FIG. 13 is a schematic perspective view illustrating a dynamic vibration absorber according to a second embodiment in the present invention. A dynamic vibration absorber 501 according to the present embodiment includes a weight section 521 and first and second arm sections 51a, 51b. The weight section 521 includes an insulating layer 41 in a substantially square shape and a conductive foil 251 provided on the insulating layer 41, which constitute a mass unit of the dynamic vibration absorber 501. That is, the weight section 521 includes a plurality of stacked single-layer materials having different degrees of elasticity and specific gravities. In the present embodiment, the weight section 521 includes the conductive foil 251 including a plurality of linear patterns 25e and the insulating layer 41. Those linear patterns 25e are disposed at intervals. It is to be noted that the linear patterns are locally connected by a plurality of connectors 25e₂ to be integrated. That is, the dynamic vibration absorber 501 according to the present embodiment differs from the dynamic vibration absorber 50 according to the above-described first embodiment in that the flexure substrate 24 is removed and the weight section 52 is replaced by the weight section 521, and other configurations are the same as those of the first embodiment, the weight section 52 including the conductive foil 25 formed of the island-shaped pattern 25c, the weight section 521 including the conductive foil 251 formed of the plurality of linear patterns 25e. Thus, description of the components in the same configuration is omitted. Although the flexure substrate 24a is not provided under the insulating layer 41 in the present embodiment, the flexure substrate 24a may be provided. Although the linear patterns are connected by the connectors 25e₂, the connectors 25e₂ may not be provided.

In the present embodiment, the linear patterns 25e extend in the perpendicular direction (the X-axis direction in FIG. 13) to the extending direction (the Y-axis direction in FIG. 13) of the arm section 51, and are disposed at intervals in the extending direction. That is, the conductive foil 251 presents a stripe pattern. Also, $d_1$ is the width of the linear patterns 25e in the extending direction of the arm section 51, $c_1$ is the length of the linear patterns 25e in the direction perpendicular to the extending direction of the arm section 51, and t is the thickness of the insulating layer 41 in the vertical direction (the Z-axis direction in FIG. 13) to the plane. In the first and second arm sections 51a, 51b, $L_1/2$ is the length in the extending direction, $b_1$ is the width in the perpendicular direction to the extending direction, and t is the thickness in the vertical direction to the plane of the insulating layer 41.

Since the weight section 521 is supported by the first and second arm sections 51a, 51b from two directions, and thus the dynamic vibration absorber 501 may be regarded as a both end fixed beam as described above. Since a cross-sectional shape of the first and second arm sections 51a, 51b in the perpendicular direction to the extending direction is a rectangular shape having width $b_1$ and thickness t, cross-sectional second moment $I_{51}$ in a horizontal direction is generally expressed by the following Formula (6).

$$I_{51} = \frac{b_1^3 \cdot t}{12} \qquad \text{Formula (6)}$$

Substituting Formula (6) into Formula (4) gives the following Formula (7) for the spring constant (bending elasticity) $k_{51}$ of the arm section 51.

$$k_{51} = \frac{192 \cdot E \cdot t \cdot b_1^3}{12 \cdot L_1^3} \qquad \text{Formula (7)}$$

Let ρ be the specific gravity of the conductive foil 251, and $n_1$ be the number of the linear patterns 25e, then mass $m_{521}$ of the weight section 521 is expressed by the following Formula (8).

$$m_{521} = n_1 \cdot \rho \cdot (d_1 \cdot c_1 \cdot t) \qquad \text{Formula (8)}$$

It is to be noted that the insulating layer 41 supporting the conductive foil 251 has a low specific gravity and a thin thickness, and thus is not dominant over the mass of the weight section 521 and is not take into consideration. Substituting Formula (7) and (8) into the aforementioned Formula (1) gives the following Formula (9) for the natural frequency $\omega_{501}$ of the dynamic vibration absorber 501.

$$\omega_{501} = \frac{1}{2\pi}\sqrt{\frac{16 \cdot E \cdot b_1^3}{L_1^3 \cdot (n_1 \cdot \rho \cdot d_1 \cdot c_1)}} \qquad \text{Formula (9)}$$

In general, the amount of processing in etching processing varies with the etching rate. Thus, for instance, change rate (α−1) due to a variation in etching processing is considered for the width $b_1$ of the first and second arm sections 51a, 51b. That is, dimensional change coefficient α due to variation in etching is defined. With this consideration, the width $b_1$ of the first and second arm sections 51a, 51b is modified to $\alpha b_1$ which is illustrated by a dashed line in FIG. 13. Thus, the spring constant (bending elasticity) $k_{\alpha 51}$ of the first and second arm sections 51a, 51b is expressed by the following Formula (10).

$$k_{\alpha 51} = \frac{16 \cdot E \cdot t \cdot (\alpha b_1)^3}{L_1^3} \qquad \text{Formula (10)}$$

On the other hand, similarly to the first and second arm sections 51a, 51b, the weight section 521 has a dimensional error of $(\alpha-1)b_1$ due to a variation in etching processing. Let the width $d_1$ of the linear patterns 25e be β times the width $b_1$ of the arm section 51 using coefficient β, that is, $d_1 = \beta b_1$, then mass $m_{\alpha 521}$ of the weight section 521 is expressed by the following Formula (11).

$$m_{\alpha 521} = n_1 \cdot \rho \cdot [\beta b_1 + (\alpha-1)b_1] \cdot [c_1 + (\alpha-1)b_1] \cdot t \qquad \text{Formula (11)}$$

In the case where the length $c_1$ of the linear patterns 25e is sufficiently larger than the width $b_1$ of the first and second arm sections 51a, 51b, the dimensional error of $(\alpha-1)b_1$ is extremely smaller than $c_1$, and change is assumed to be almost zero. Thus, the mass $m_{\alpha 521}$ can be expressed in a simplified form by the following Formula (12).

$$m_{\alpha 521} = n_1 \cdot t \cdot \rho \cdot [\beta b_1 + (\alpha-1)b_1] \cdot c_1 \qquad \text{Formula (12)}$$

Based on Formula (10) and Formula (12), the natural frequency $\omega_{\alpha 501}$ of the dynamic vibration absorber 501 with an occurrence of a dimensional error is expressed by the following Formula (13).

$$\omega_{\alpha 501} = \frac{1}{2\pi}\sqrt{\frac{16 \cdot E \cdot (\alpha b_1)^3}{L_1^3 \cdot n_1 \cdot \rho \cdot [\beta b_1 + (\alpha-1) \cdot b_1] \cdot c_1}} \qquad \text{Formula (13)}$$

Let the change rate due to a variation in etching processing be (α−1), based on Formula (9) and Formula (13), change rate $\omega_{\alpha 501}/\omega_{501}$ of the natural frequency is expressed by the following Formula (14).

$$\frac{\omega_{\alpha 501}}{\omega_{501}} = \sqrt{\frac{\alpha^3 \cdot \beta}{\beta + \alpha - 1}} \qquad \text{Formula (14)}$$

When β=1, that is, the width $d_1$ of the linear patterns 25e equals the width $b_1$ of the arm section 51, it is seen from Formula (14) that the natural frequency of the dynamic vibration absorber 501 varies with the constant of variation of the dimensional change coefficient α. Also, it is seen that the change rate $\omega_{\alpha 501}/\omega_{501}$ of the natural frequency of the dynamic vibration absorber 501 for the dimensional change coefficient α is determined by the value of coefficient β. That is, the number $n_1$ of the linear patterns 25e, the length $c_1$ of the linear patterns 25e, and the thickness t of the linear patterns 25e that determine the mass of the weight section 521 have no effect on the change rate $\omega_{\alpha 501}/\omega_{501}$ of the natural frequency, and thus the natural frequency of the dynamic vibration absorber 501 may be set in a wide frequency range.

Figure 14:
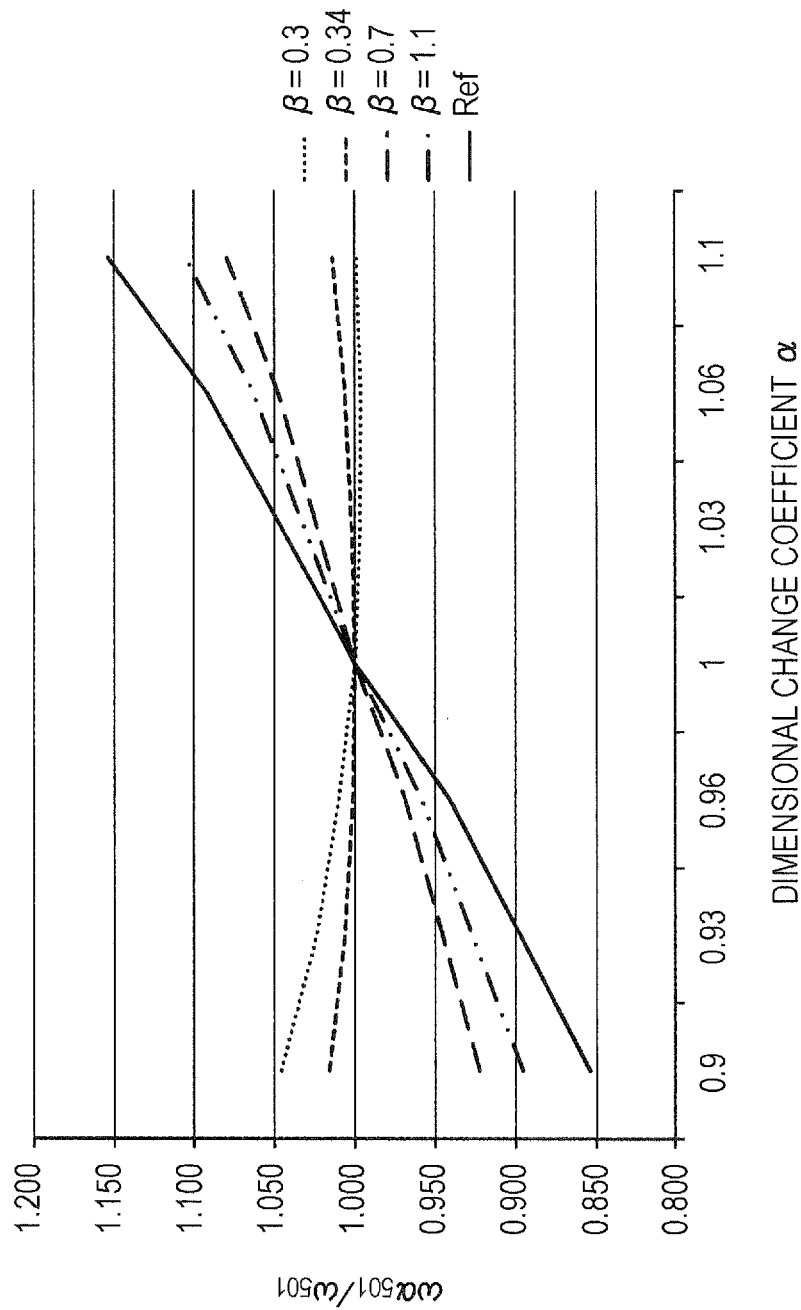
FIG. 14 is a graph illustrating relationships between the natural frequency of the dynamic vibration absorber in FIG. 13 and the dimensional change coefficient of an arm section.

FIG. 14 illustrates graphs using the coefficient β in Formula (14) as a parameter where the horizontal axis indicates dimensional change coefficient α and the vertical axis indicates change rate $\omega_{\alpha 501}/\omega_{501}$ of the natural frequency. In this example, transition of the change rate $\omega_{\alpha 501}/\omega_{501}$ of the natural frequency is illustrated for the dimensional change coefficient α in a range of 0.9 to 1.1 and the coefficient β is from 0.3 to 1.1. It is to be noted that Ref in FIG. 14 indicates the change rate of the natural frequency when the weight section 521 is nearly constant regardless of the dimensional change coefficient α, that is, when only the spring constant of the arm section 51 changes. As illustrated in FIG. 14, as the value of the coefficient β decreases, that is, as the value of the width $d_1$ of the linear patterns 25e of the weight section 521 with respect to the width $b_1$ of the arm section 51 decreases, the effect received by the natural frequency of the dynamic vibration absorber 501 decreases. The change rate $\omega_{\alpha 501}/\omega_{501}$ of the natural frequency is the smallest when β=0.34, and it is seen that the effect received by the natural frequency of the dynamic vibration absorber 501 decreases according to the dimensional change coefficient α.

As described above, the dynamic vibration absorber 501 according to the present embodiment has a configuration in which at least one single-layer material, which is out of the single-layer materials of the weight section 521 and shared in common with the single-layer materials of the arm section 51, has the linear patterns 25e. Therefore, the degree of change of each of elastic change of the arm section 51 and mass change of the weight section 521 due to the same dimensional error is made smaller, thereby achieving the dynamic vibration absorber 501 that has a highly stable frequency of vibration to be absorbed. Also, the linear patterns 25e may be provided at one time in a process of forming the outer shape of the weight section and the arm section, and thus the dynamic vibration absorber may be provided without adding a new process.

Third Embodiment

Figure 15:
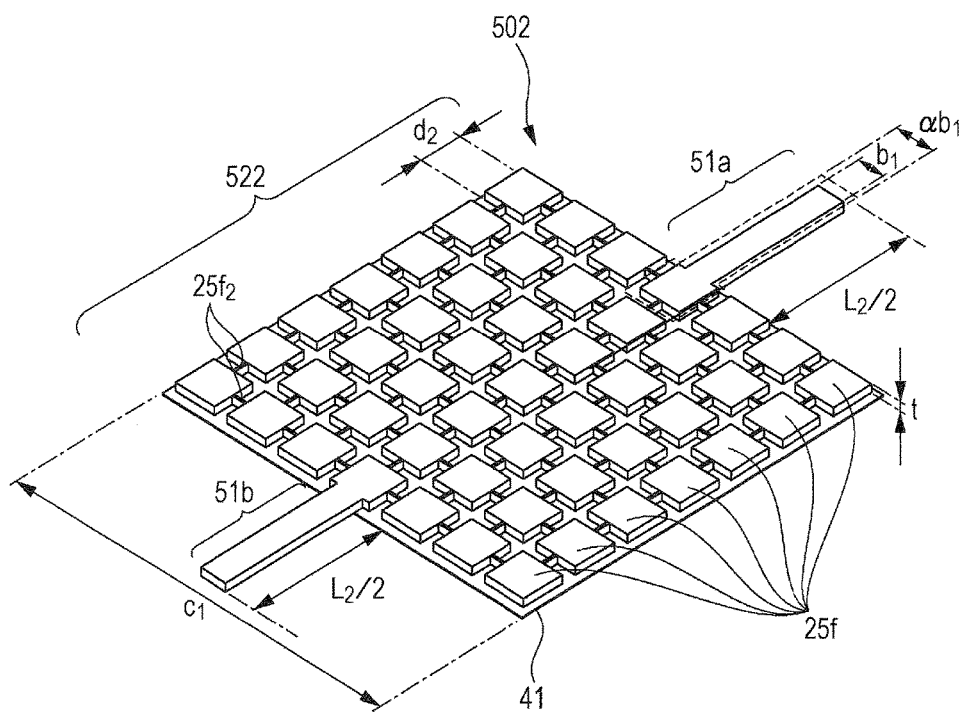
FIG. 15 is a schematic perspective view illustrating a dynamic vibration absorber according to a third embodiment in the present invention.

FIG. 15 is a schematic perspective view illustrating a dynamic vibration absorber according to a third embodiment in the present invention. The dynamic vibration absorber 502 according to the third embodiment includes a weight section 522 and the first and second arm sections 51a, 51b. The weight section 522 includes a plurality of substantially square patterns 25f, the substantially square patterns 25f are disposed at intervals and the square patterns are connected by connectors 25$f_2$ to be integrated, and provided on the insulating layer 41 in a substantially square shape. That is, similarly to the first embodiment, the weight section 522 includes a plurality of stacked single-layer materials having different degrees of elasticity and specific gravities. That is, the dynamic vibration absorber 502 according to the present embodiment differs from the dynamic vibration absorber 50 according to the above-described first embodiment in that the flexure substrate 24 is removed and the weight section 52 is replaced by the weight section 522, and other configurations are the same as those of the first embodiment, the weight section 52 including the conductive foil 25 formed of the island-shaped pattern 25c, the weight section 522 including the conductive foil 252 formed of the substantially square patterns 25f. Thus, description of the components in the same configuration is omitted. Although the flexure substrate 24a is not provided under the insulating layer 41 in the present embodiment, the flexure substrate 24a may be provided. Although the linear patterns are connected by the connectors 25$f_2$, the connectors 25$f_2$ may not be provided.

Here, the plurality of substantially square patterns 25f are disposed at intervals in the extending direction of the arm section 51 and the perpendicular direction to the extending direction. That is, the conductive foil 252 presents a dot matrix pattern. In the substantially square patterns 25f, $d_2$ is the length of each side and t is the thickness of the square patterns 25f in the vertical direction (the Z-axis direction in FIG. 15) to the plane of the insulating layer 41. Similarly to the first embodiment, in the first and second arm sections 51a, 51b, $L_2/2$ is the length in the extending direction, $b_1$ is the width in the perpendicular direction to the extending direction, and t is the thickness in the vertical direction to the plane of the insulating layer 41.

The natural frequency $\omega_{502}$ of the dynamic vibration absorber 502 may be determined based on the spring constant (bending elasticity) $k_{51}$ of the arm section 51 and the mass $m_{522}$ of the weight section 522. The conductive foil 252 included in the weight section 522 serving as the mass unit has a configuration in which any number $n_2$ of patterns 25f, each of which is a square having a size of $d_2 \times d_2$, are disposed in a dot matrix form. The any number $n_2$ is determined by adjusting the mass $m_{522}$ of the weight section 522 so as to resonate with a frequency desired to be absorbed by the dynamic vibration absorber 502, and the mass $m_{522}$ is expressed by the following Formula (15).

$$m_{522} = n_2 \cdot d_2^2 \cdot t \cdot \rho \qquad \text{Formula (15)}$$

Based on Formula (15) and the spring constant $k_{51}$ of the arm section 51 in Formula (7), the natural frequency $\omega_{502}$ of the dynamic vibration absorber 502 is expressed by the following Formula (16).

$$\omega_{502} = \frac{1}{2\pi} \sqrt{\frac{16 \cdot E \cdot b_1^3}{L_2^3 \cdot n_2 \cdot \rho \cdot d_2^2}} \qquad \text{Formula (16)}$$

Here, when the width $b_1$ of the first and second arm sections 51a, 51b varies with the dimensional change coefficient α, that is, a dimensional error of $(\alpha-1)b_1$ occurs, the mass $m_{\alpha 522}$ of the weight section 522 is expressed by the following Formula (17).

$$m_{\alpha 522} = n_2 \cdot \rho \cdot t \cdot [d_2 + (\alpha-1)b_2]^2 \qquad \text{Formula (17)}$$

Similarly to the second embodiment described above, let the length $d_2$ be β times the width $b_1$ of the arm section 51 using coefficient β, that is, $d_2 = \beta b_1$, then based on Formula (17) and the spring constant $k_{\alpha 51}$ of the arm section with an occurrence of a dimensional error in Formula (10), the natural frequency $\omega_{\alpha 502}$ of the dynamic vibration absorber 502 with an occurrence of a dimensional error is expressed by the following Formula (18).

$$\omega_{\alpha 502} = \frac{1}{2\pi}\sqrt{\frac{16 \cdot E \cdot (\alpha b_1)^3}{L_2^3 \cdot n_2 \cdot \rho \cdot [\beta + (\alpha - 1)]^2 b_1^2}} \quad \text{Formula (18)}$$

Based on Formula (16) and Formula (18), the change rate $\omega_{\alpha 502}/\omega_{502}$ of the natural frequency is expressed by the following Formula (19).

$$\frac{\omega_{\alpha 502}}{\omega_{502}} = \sqrt{\frac{\alpha^3 \cdot \beta^2}{(\beta + \alpha - 1)^2}} \quad \text{Formula (19)}$$

It is seen from Formula (19) that the change rate $\omega_{\alpha 502}/\omega_{502}$ of the natural frequency of the dynamic vibration absorber 502 for the dimensional change coefficient α is determined by the value of coefficient β. That is, the number $n_2$ of the substantially square patterns 25f that determines the mass of the weight section 522, and the thickness t of the substantially square patterns 25f have no effect on the change rate $\omega_{\alpha 502}/\omega_{502}$ of the natural frequency, and thus the natural frequency of the dynamic vibration absorber 502 may be set in a wide frequency range.

Figure 16:
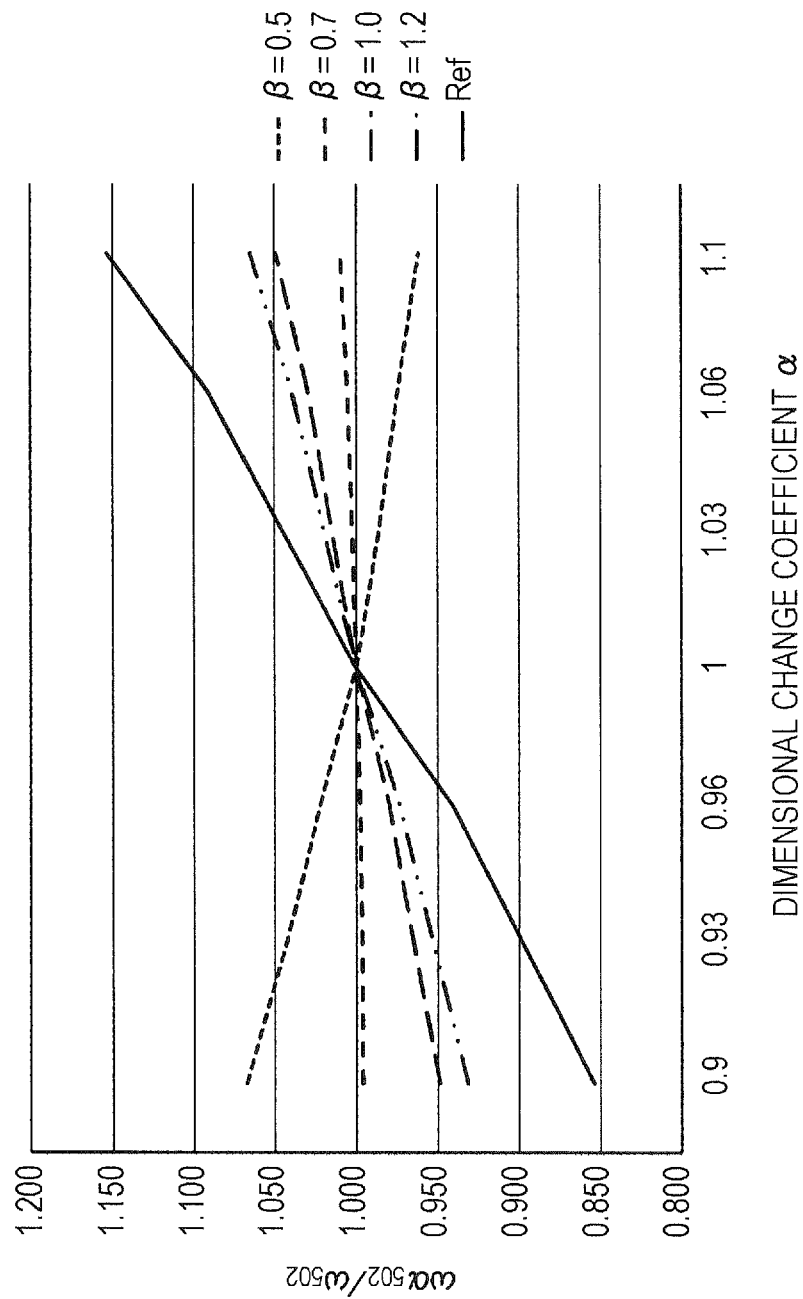
FIG. 16 is a graph illustrating relationships between the natural frequency of the dynamic vibration absorber in FIG. 15 and the dimensional change coefficient of the arm section.

FIG. 16 illustrates graphs using the coefficient β in Formula (19) as a parameter where the horizontal axis indicates dimensional change coefficient α and the vertical axis indicates change rate $\omega_{\alpha 502}/\omega_{502}$ of the natural frequency. In this example, transition of the change rate $\omega_{\alpha 502}/\omega_{502}$ of the natural frequency is illustrated for the dimensional change coefficient α in a range of 0.9 to 1.1 and the coefficient β is from 0.5 to 1.2. It is to be noted that Ref in FIG. 16 indicates the change rate $\omega_{\alpha 502}/\omega_{502}$ of the natural frequency when the weight section 522 is nearly constant regardless of the dimensional change coefficient α, that is, when only the spring constant of the arm section 51 changes.

As illustrated in FIG. 16, it is seen that the effect on the natural frequency of the dynamic vibration absorber 502 is the smallest when the value of the coefficient β is 0.7. Like this when the weight section 522 is formed of a plurality of squares each having a side of $0.7b_1$ for the width $b_1$ of the arm section 51, the natural frequency of the dynamic vibration absorber 502 may be easily adjusted by the number of squares and it is possible to achieve a dynamic vibration absorber that has a small variation in the natural frequency of the dynamic vibration absorber 502 with a dimensional error of the arm section 51. Although a dimensional error in the width of the arm section is generally caused by, for instance, the process capability and/or the processing accuracy of an etching processing device, even with the same process capability and/or processing accuracy, the change rate of the dimensional change coefficient α increases as the width of the arm section decreases. Even in this situation, it is possible to obtain a dynamic vibration absorber that has a small variation in the natural frequency of the dynamic vibration absorber with a dimensional error of the arm section. It is to be noted that the shape pattern provided in the weight section is not limited to a square. For instance, a circular pattern or a pattern in which a plurality of polygonal shapes is arranged may be used.

It is seen from FIG. 14 that the change rate $\omega_{\alpha 501}/\omega_{501}$ of the natural frequency in the second embodiment is such that transition of the change rate of natural frequency indicates the opposite behaviors for the value of the coefficient β greater than approximately 0.34 and less than 0.34. Also, it is seen that when the value of the coefficient β falls below 0.7, the change rate $\omega_{\alpha 502}/\omega_{502}$ of the natural frequency in the present embodiment in FIG. 16 has the opposite behavior compared with transition of the change rate of the natural frequency for the coefficient β of 0.7 or greater. That is, this indicates that for the coefficient β with a value less than 0.34 in the second embodiment, and for the coefficient β with a value less than 0.7 in the present embodiment, the weight section 521 and the weight section 522 respectively have greater change rates than the change rate of the spring constant of the arm section 51. Thus, the difference between those coefficients β is used and by combining the linear patterns 25e as in the second embodiment and the substantially square patterns 25f in the present embodiment, it is possible to cancel a variation in the natural frequency of the dynamic vibration absorber and to achieve a dynamic vibration absorber that has a small variation in the natural frequency of the dynamic vibration absorber with a dimensional error of the arm section.

As described above, the dynamic vibration absorber 502 according to the present embodiment has a configuration in which at least one single-layer material, which is out of the single-layer materials of the weight section 522 and shared in common with the single-layer materials of the arm section 51, has the substantially square patterns 25f. Therefore, the degree of difference in change rate of each of elastic change of the arm section 51 and mass change of the weight section 522 due to the same dimensional error is made smaller, thereby achieving the dynamic vibration absorber that has a highly stable frequency of vibration to be absorbed. Also, the substantially square patterns 25f may be provided at one time in a process of forming the outer shape of the weight section 522 and the arm section 51, and thus the dynamic vibration absorber 502 may be provided without adding a new process.

Fourth Embodiment

Figure 17:
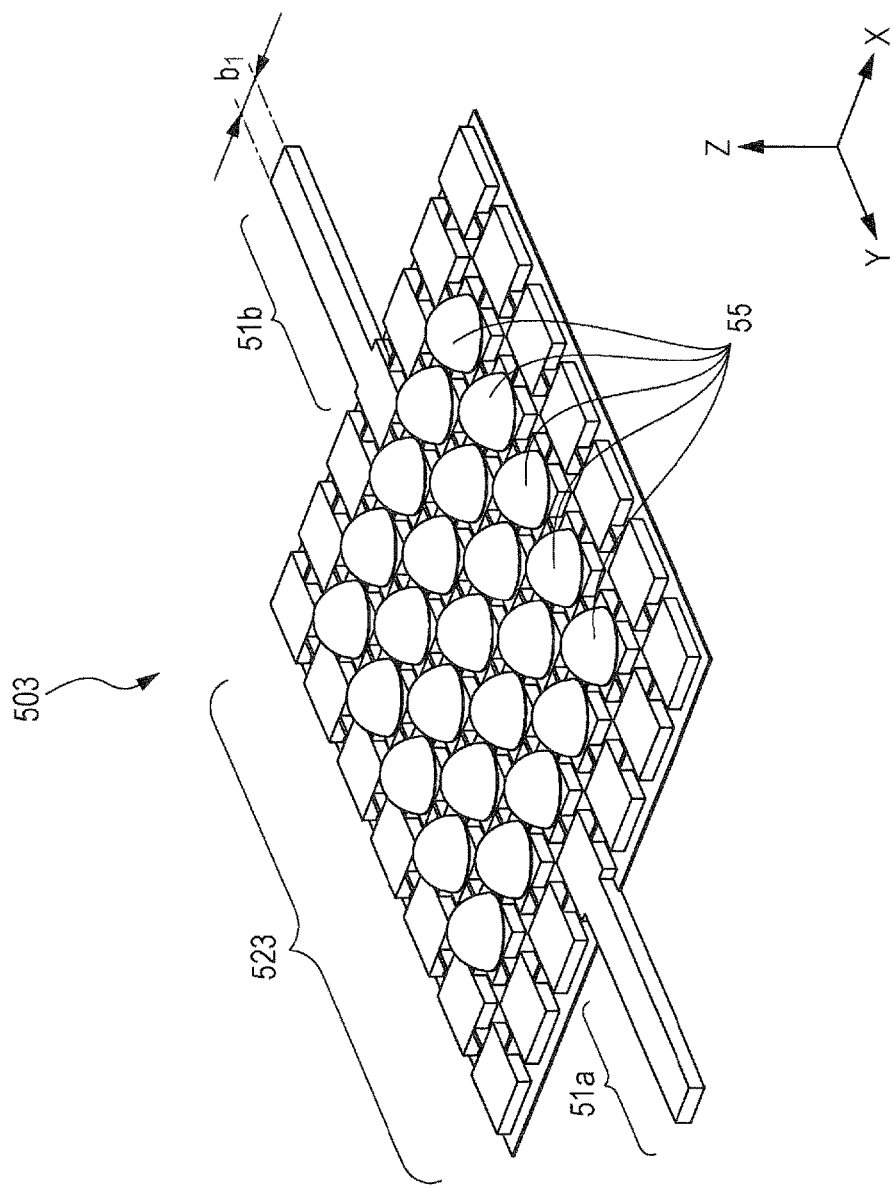
FIG. 17 is a schematic perspective view illustrating a dynamic vibration absorber according to a fourth embodiment in the present invention.

FIG. 17 is a schematic perspective view illustrating a dynamic vibration absorber according to a fourth embodiment in the present invention. A dynamic vibration absorber 503 according to the present embodiment differs from the dynamic vibration absorber 502 according to the third embodiment in that the weight section 522 is replaced by a weight section 523 and other configurations are the same as those of the third embodiment, the weight section 523 including mass adjustment mechanisms 55 that are formed by providing the wiring cover layer 42 on the polygonal patterns with a hole (not illustrated) for soldering. Thus, description of the components in the same configuration is omitted. Specifically, a plurality of mass adjustment mechanisms 55 has a configuration in which the wiring cover 42 formed to cover the substantially square patterns 25f is provided with a hole 42a and exposed, and solder is added to the hole to adjust the mass. It is to be noted that mass adjustment material used for the mass adjustment mechanisms 55 is not limited to solder. For instance, a golden ball and a silver ball may be sufficient and an adhesive having a large specific gravity may be used.

As described above, in the dynamic vibration absorber 503 according to the present embodiment, the weight section 523 includes a plurality of mass adjustment mechanisms 55. Therefore, the mass of the weight section 523 may be adjusted in a wide range, and thus it is possible to expand the setting range of frequency of vibration to be absorbed by the dynamic vibration absorber 503, the frequency being determined based on the elasticity of the arm section 51 and the mass of the weight section 523.

Hereinafter, a first example is presented in which the dynamic vibration absorber provided in the flexure is capable of suppressing the sway mode of the load beam. It is to be noted that as the first example, the head support mechanism 2 is used that includes the flexure 15 having the dynamic vibration absorber 50 according to the first embodiment. In order to compare characteristic with the first example, as a first comparative example, a head support mechanism is used in which the dynamic vibration absorber 50 is removed from the flexure 15 in the head support mechanism 2.

Figure 18:
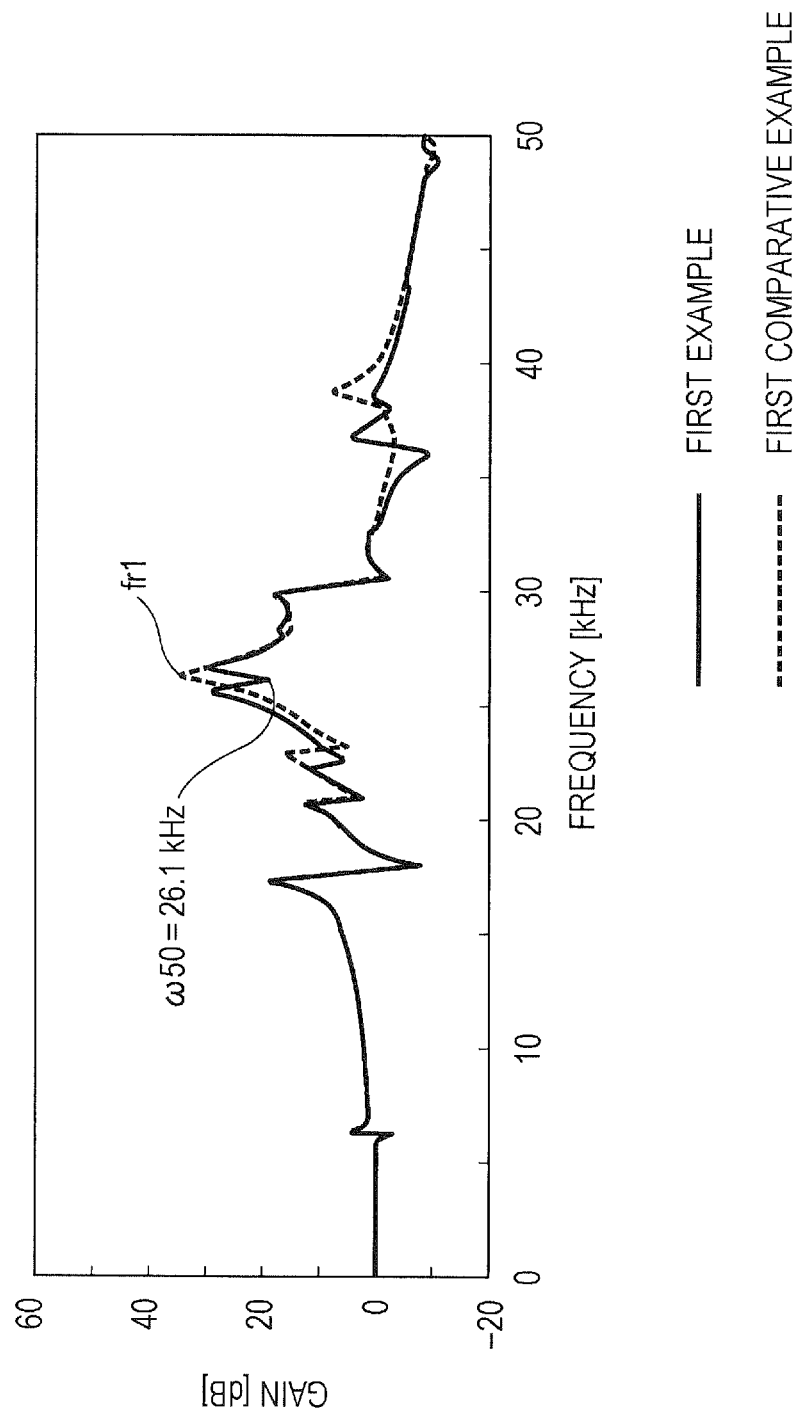
FIG. 18 is a graph illustrating the frequency response characteristic of the head support mechanism equipped with the dynamic vibration absorber according to the preferred embodiment in the present invention.

FIG. 18 illustrates the frequency response characteristic at the time of a seek operation of the head support mechanism 2 in the first example and the head support mechanism in the first comparative example. The seek operation is an operation that rotates the support arm 8 greatly for a track to be read by a voice coil motor (VCM) around the horizontal rotation shaft 9 at a maximum acceleration and stops the support arm 8 at a maximum acceleration. The operation causes the load beam 14 of the suspension to generate large resonance. The largest resonance among all is the sway mode fr1 in FIG. 18. When the position of the head element is finely adjusted by the mechanism that drives the slider 3 to rotate using the first and second drive units, no problem arises in the case where the control band includes a band that covers a resonance frequency which needs to be suppressed. However, in the case where the control band does not cover the resonance frequency, it is desirable that the gain of the resonance frequency be low. In the magnetic disk drive 1 including the head support mechanism 2, the sampling frequency is set to 48 kHz, and in this case, the control band is 6 kHz. In the comparative example, the peak of the sway mode fr1 occurs near 26 kHz which exceeds the control band. Therefore, it is not possible to suppress the gain by the first and second drive units. It is seen that although the peak of the sway mode is approximately 34 dB at near 26 kHz in the comparative example, the peak of the sway mode fr1 is suppressed to approximately 29 dB by mounting the dynamic vibration absorber 50 in the first example. That is, it has been verified that a vibration caused by the sway mode excited by the load beam 14 at the time of a seek operation is significantly suppressed by the dynamic vibration absorber 50 in the first example.

What is claimed is:

1. A dynamic vibration absorber comprising:
   an arm section that includes an elastic unit; and
   a weight section that is directly connected to and supported by the arm section and includes a mass unit,
   wherein:
   the arm section and the weight section each include a plurality of stacked single-layer materials having different degrees of elasticity and specific gravities, and
   at least one of the single-layer materials of the arm section and at least one of the single-layer materials of the weight section are comprised of the same material.

2. The dynamic vibration absorber according to claim 1, wherein, among the at least one of the single-layer materials of the weight section, at least one single-layer material has one of patterns of a linear shape, a curved shape, a circular shape, and a polygonal shape or a geometric design pattern including a combination of the patterns.

3. The dynamic vibration absorber according to claim 1, wherein the at least one of the single-layer materials of the arm section and the at least one of the single-layer materials of the weight section are composed of a material having viscoelasticity.

4. The dynamic vibration absorber according to claim 1, further comprising
   a plurality of the arm sections, and
   the arm sections are each directly connected to the weight section.

5. The dynamic vibration absorber according to claim 1, wherein the weight section further includes a mass adjustment mechanism including a plurality of mass adjustment pads.

6. The dynamic vibration absorber according to claim 1, wherein the at least one of the single-layer materials of the arm section and the at least one of the single-layer materials of the weight section form a continuous layer.

7. The dynamic vibration absorber according to claim 1, wherein the weight section has a layer that is not included in the arm section.

8. The dynamic vibration absorber according to claim 1, wherein the arm section has a lower bending elasticity than the weight section.

9. The dynamic vibration absorber according to claim 1, wherein the arm section is formed by etching a layer away from the weight section.

10. The dynamic vibration absorber according to claim 1, wherein there is no structural boundary between the arm section and the weight section.

11. The dynamic vibration absorber according to claim 1, wherein:
    the arm section includes a first arm portion and a second arm portion;
    the weight section is positioned between the first arm portion and the second arm portion;
    the first arm portion is connected on one end to the weight section and extends a first direction from the weight section;
    the second arm portion is connected on one end to the weight section and extends a second direction from the weight section; and
    the first direction and the second direction are different directions.

12. The dynamic vibration absorber according to claim 11, wherein the first direction and the second direction are opposite directions along a common axis.

13. A flexure that is supported by a flexure substrate having elasticity and that includes a flexible wiring substrate in which a conductive foil and an insulation layer are stacked,
    the flexure comprising:
    a main body;
    an opening provided in the main body; and
    a dynamic vibration absorber disposed in the opening,
    wherein the dynamic vibration absorber includes
    an arm section including an elastic unit, and
    a weight section that is directly connected to and supported by the arm section and includes a mass unit,
    wherein:
    the arm section and the weight section each include a plurality of stacked single-layer materials having different degrees of elasticity and specific gravities, and
    at least one of the single-layer materials of the arm section and at least one of the single-layer materials of the weight section are comprised of the same material.

14. The flexure according to claim 13,
    wherein the at least one of the single-layer materials of the arm section and the at least one of the single-layer materials of the weight section include one of the flexure substrate, the conductive foil, and the insulation layer.

15. The flexure according to claim 13, wherein, among the at least one of the single-layer materials of the weight section, at least one single-layer material has one of patterns of a linear shape, a curved shape, a circular shape, and a polygonal shape or a geometric design pattern including a combination of the patterns.

16. The flexure according to any claim 13, wherein the at least one of the single-layer materials of the arm section and the at least one of the single-layer materials of the weight section are composed of a material having viscoelasticity.

17. The flexure according to claim 13, further comprising a plurality of the arm sections, and the arm sections are each connected to the weight section.

18. The flexure according to claim 13, wherein the weight section further includes a mass adjustment mechanism including a plurality of mass adjustment pads.

19. A head support mechanism comprising:
a slider including a head element;
a load beam that applies a load to a disc surface of a target recording medium to which information is written;
a support projection provided at a tip end of the load beam;
a slider substrate that rotatably supports the slider around the support projection;
a drive element that applies a rotational force to the slider substrate; and
a flexure that is supported by a flexure substrate having elasticity and that includes a flexible wiring substrate in which a conductive foil and an insulation layer are stacked,
wherein the flexure includes
a main body,
an opening provided in the main body, and
a dynamic vibration absorber disposed in the opening, and
wherein the dynamic vibration absorber includes
an arm section including an elastic unit, and
a weight section that is directly connected to and supported by the arm section and includes a mass unit, and
the arm section and the weight section each include a plurality of stacked single-layer materials having different degrees of elasticity and specific gravities, and at least one of the single-layer materials of the arm section and at least one of the single-layer materials of the weight section are comprised of the same material.

20. The head support mechanism according to claim 19, wherein the main body is fixed to the load beam, and the at least one of the single-layer materials of the arm section and the at least one of the single-layer materials of the weight section include one of the flexure substrate, the conductive foil, and the insulation layer.

* * * * *